United States Patent
Kato et al.

(10) Patent No.: US 7,533,100 B2
(45) Date of Patent: May 12, 2009

(54) NETWORK SYSTEM, ELEMENT THEREOF AND CONTEXT MANAGEMENT METHOD

(75) Inventors: Hiroki Kato, Kanagawa (JP); Hirotoshi Maegawa, Tokyo (JP); Takayuki Ishida, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 312 days.

(21) Appl. No.: 11/357,063

(22) Filed: Feb. 21, 2006

(65) Prior Publication Data
US 2006/0190551 A1 Aug. 24, 2006

(30) Foreign Application Priority Data
Feb. 21, 2005 (JP) .............................. 2005-043814

(51) Int. Cl.
*G06F 17/30* (2006.01)
(52) U.S. Cl. ............................................ 707/10; 707/9
(58) Field of Classification Search ........................ None
See application file for complete search history.

(56) References Cited

U.S. PATENT DOCUMENTS

| | | | |
|---|---|---|---|
| 2002/0180777 A1* | 12/2002 | Kusumoto et al. | 345/733 |
| 2004/0189715 A1* | 9/2004 | Matthews et al. | 345/810 |
| 2005/0203910 A1* | 9/2005 | Taguchi et al. | 707/10 |
| 2007/0088724 A1* | 4/2007 | Demiroski et al. | 707/100 |

* cited by examiner

*Primary Examiner*—Jean M Corrielus
*Assistant Examiner*—Loan T Nguyen
(74) *Attorney, Agent, or Firm*—Michael Bednarek; Paul, Hastings, Janofsky & Walker LLP

(57) ABSTRACT

On a network, there are provided a plurality of shared fields enabling a plurality of computers to interact with each other. The computer is allowed to move between the shared fields anytime. Upon leaving a shared field, the computer records, on the network, contexts including identification of another computer relating to the interaction. When participating in another shared field, the user reads out the contexts from the network and reflects them on another interaction held in the latter shared field. Thus, interactions on shared fields act on construction of global fields for interactions.

34 Claims, 29 Drawing Sheets

NETWORK SYSTEM, ELEMENT THEREOF AND CONTEXT MANAGEMENT METHOD

CROSS REFERENCE TO RELATED APPLICATION

The present application claims priority from Japanese Application No. 2005-43814 filed Feb. 21, 2005, the disclosure of which is hereby incorporated by reference herein.

BACKGROUND OF THE INVENTION

This invention relates to a network system, which facilitates global interactions among a plurality of computers, and to techniques relevant thereto.

Recently, many users are in communication with each other in a shared field or space which is constructed within a logical space on a global network such as the Internet, i.e. an area accessible with network-connected computers of the users.

Such a shared field has a participation-based development property that many users participate in or join the shared field by using the respective computers and interact with each other in the shared field so that the shared field is developed. For example, the more the number of users participant in a shared field increases, the larger the scale of the shared field becomes. In addition, the more the number of computers on a global network increases, the larger the number of shared fields on the global network becomes.

Conventional management of shared field is generally carried out on a so-called "client-server type" network system, wherein computers operated by participant users are "clients", and a "server" manages the shared field which the clients are accessible.

However, according to the conventional management on the above-mentioned network system, the shared field does not necessarily change in correspondence with, for example, intentions of users participating in the shared field. Therefore, the system cannot make sufficient use of the above-explained participation-based development property of shared field so that a communication scheme, which is effective in a shared field, often becomes ineffective in another shared field.

In a client-server type network system, free access of many users or many computers to a shared field causes a server to have an extremely large load; it is very difficult to solve the load by means of mere customization of communication tools.

Each shared field has various unique attributes, which are effective only in the shared field but are ineffective in other places, such as rules relating to participation only in the shared field and rules concerning behavior allowable only within the shared field. Because of the existence of the unique attributes, a user moving from one shared field to another shared field should further adapt to the attributes of the latter shared field; the user has a problem of burdensomeness.

SUMMARY OF THE INVENTION

It is an object of the present invention to provide a network system and an element of the network system, wherein the network system can construct a share field which makes sufficient use of its participation-based development property without any restrictions.

It is another object of the present invention to provide a context management method which enables effective management of the above-mentioned network system.

According to one aspect of the present invention, a network system comprises: first means for creating or updating a shared field which is accessible by a plurality of users through a plurality of computers, respectively; second means for storing a shared-field context in a first memory area on the network, wherein the shared-field context describes at least one of features of the shared field, the features are caused within the shared field by inputs from the users accessing the shared field or by interactions among the plurality of users; third means for storing a user context as well as its reference in a second memory area on the network, wherein the user context is a context which is unique to a user operating one of the accessing computers and is caused within the shared field by an input from the operating user or by the interaction associated with the operating user, and the reference is usable for referring to the first memory area; and fourth means for leading each of the plurality of users to obtain, through an arbitrary one of the computers, the user context of himself/herself stored in the second memory area or the shared-field context of the shared field, which the user accesses, by the use of the reference stored in the second memory area.

"Shared-field context" includes, in addition to an identification of a shared field thereof, information such as individual history records relating to the time record of the interaction in the shared field, the participant users on the interaction and the details of the interaction. Shared-field context also includes an object or aim, a budget, a strategy, a cultural background, a regulation, and so on, of the management of shared field. In order that a user accesses a shared field and acts within the shared field, the user should be adapted to the shared-field context of the shared field.

"User context" is an attribute which is unique to the user relating thereto and is changed in accordance with each of the interactions that the user carries out in the shared field accessed, wherein the attribute is for example an identification usable for identifying the user in question, a favorite, a time record, a shared-field identification, an act record, an experience record, and a party record, wherein the favorite is of the user in question, the time record is of the access of the user to the shared field, the shared-field identification is usable for identifying the shared field accessed by the user, the act record relates to activities of the user, the experience record includes information which kind of impression, sympathy and satisfaction the user experiences, the party record is usable for identifying another party who interacts with the user in the shared field.

The "user context" is updated every time the user carries out an interaction in the shared field accessed, wherein the update is carried out on the basis of the interaction and on the basis of change of the shared-field context caused by the interaction. Thus, a unique attribute of each user is changed every time the user accesses a shared field and carries out an interaction in the shared field.

For example, the first means is so constructed that it receives a preformed query and creates or updates the shared field on the basis of the query, wherein the query is transmitted from another one of the computers and is transferred on the network, the query describing a condition relating to creating or updating the shared field. The network system may be so constructed that it further comprises a communicator adapted to send, back to a source node of the query, information enabling the source node to access the shared field created or updated by the first means.

For one embodiment, the first means further comprises: arrangement and arbitration module operative to arrange objects existing on the shared field and to arbitrate between activities of the objects; and management module operative, under the arbitration by the arrangement and arbitration module, to control procedural steps in interactions among a plurality of users within the shared field and to notify the second means of changes caused by the interactions within the shared field.

For example, the second means comprises: a user-context obtainer adapted to obtain a user context of a user accessing the shared field; and a shared-field-context updater adapted to update the shared-field context in correspondence with the obtained user context.

For example, the third means is so constructed that, in response to a request from one of computers connected to the network, the third means sends back to the computer at least one of the user context and the reference which are stored in the second memory area. Therefore, each user can obtain its user context or refer for the shared-field context of the shared field accessed by the user, even if the user does not participate in the shared field.

In addition, the third means may be so embodied that it modifies the user context, which has been already stored in the second memory area, every time the user carries out the interaction in the shared field accessed, wherein the modification is carried out on the basis of the interaction and on the basis of change of the shared-field context caused by the interaction.

In the case where each of the user contexts obtained by the user-context obtainer includes an attribute which is unique to the user relating thereto and is changed in accordance with each of the interactions that the user carries out in the shared field accessed, the second means creates relation information on the basis of the attributes included in the user contexts of the users, wherein the relation information is usable for identifying the relation between the users; the second means further updates the shared-field context stored in the first memory area to add the relation information thereinto.

Another aspect of the present invention provides a context management method carried out in a network system in which a plurality of computers are connected through a network.

The method comprises: creating or updating a shared field which is accessible by a plurality of users through a plurality of computers, respectively, wherein creating or updating the shared field is carried out by one of the computers connected to the network; storing a shared-field context in a first memory area on the network, wherein storing the shared-field context is carried out by the computer which carried out creating or updating the shared field, the shared-field context describes at least one of features of the shared field, the features are caused within the shared field by inputs from the users accessing the shared field or by interactions among the plurality of users, and; storing a user context as well as a reference in a second memory area on the network, wherein storing the user context as well as the reference is carried out by each of the computers accessing the shared field, the user context is a context which is unique to a user operating one of the accessing computers and is caused within the shared field by an input from the operating user or by the interaction associated with the operating user, and the reference is usable for referring to the first memory area, wherein each of the plurality of users is led to obtain, through an arbitrary one of the computers, the user context of himself/herself stored in the second memory area or the shared-field context of the shared field, which the user accessed, by the use of the reference stored in the second memory area.

In the method, creating or updating the shared field may be carried out, on the basis of a preformed query, by one of the computers which receives the query, wherein the query is transmitted from another one of the computers connected to the network and describes a condition relating to creating or updating the shared field.

According to one embodiment of the present invention, one of the computers connected to the network may obtain the user context from the second memory area and may access the shared field or another shared field different therefrom in connection with the obtained user context, which concerns the user operating the computer in question. The embodiment makes it possible that the past interaction carried out by the user is affected on the next interaction.

In this event, the computer obtaining the user context creates a new user context by modifying the former user context used upon the access to the shared field or to the different shared field, wherein the modification is carried out on the basis of the interaction between the users within the shared field accessed and on the basis of change of the shared-field context caused by the interaction, and the computer stores the created new user context in the second memory area.

In the method, the computer creating or updating the shared field updates a content of the shared-field context in correspondence with the user context of the user which operates the computer accessing the shared field.

In a method according to an embodiment of the present invention, each of the user contexts includes an attribute which is unique to the user relating thereto and is changed in accordance with each of the interactions that the user carries out in the shared field accessed; on the basis of the attributes included in the user contexts of the users, the computer creating or updating the shared field creates relation information to identify the relation between the users and updates the shared-field context stored in the first memory area to add the relation information thereinto. In this embodiment, in addition to an identification usable for identifying the user in question, the attribute comprises at least one of a favorite, a time record, a shared-field identification, an act record, an experience record, and a party record, wherein the favorite is of the user in question, the time record is of the access of the user to the shared field, the shared-field identification is usable for identifying the shared field accessed by the user, the act record relates to activities of the user, the experience record includes information which kind of impression, sympathy and satisfaction the user experiences, the party record is usable for identifying another member who interacts with the user in the shared field; the computer creating or updating the shared field creates the relation information by identifying the users whose user contexts have the attributes equal to or similar to each other in consideration of a predetermined condition.

In a method according to an embodiment of the present invention, each of the plurality of computers is on an equality with other computers and is performable separately therefrom; the first and the second memory areas are formed on one of the computers which is accessible by any other ones of the computers through the network. In addition, the computer connected to the network transfers all of information, records and data of the context management to another available computer before leaving the network. Alternatively, each of the computers is provided with a router function so that it corresponds to a node identified by a network address and holds, on a predetermined memory, routing information concerning another node neighboring thereon; each of the computers, responsive to information which is transferred from another node neighboring thereon but is not addressed thereto, adds the network address thereof to the transferred information and further transfers the transferred information with the addition towards another node identified by the routing information.

Still another aspect of the present invention provides a computer which performs as an element of the above-mentioned network system. The computer is connected to the network and includes a processor executable a computer program. In cooperation with proper hardware resources existing on the network, the processor selectively functions as one of: first means for creating or updating a shared field which is accessible by a plurality of users through a plurality of computers, respectively; second means for storing a shared-field context in a first memory area on the network, wherein the shared-field context describes at least one of features of the shared field, the features are caused within the shared field by inputs from the users accessing the shared field or by interactions among the plurality of users; third means for storing a user context as well as a reference in a second memory area on the network, wherein the user context is a context which is unique to a user operating one of the accessing computers and is caused within the shared field by an input from the operating user or by the interaction associated with the operating user, and the reference is usable for referring to the first memory area; and fourth means for leading each of the plurality of users to obtain, through an arbitrary one of the computers, the user context of himself/herself stored in the second memory area or the shared-field context of the shared field, which the user accessed, by the use of the reference stored in the second memory area.

Yet another aspect of the present invention provides a computer program adapted to cause a computer connected to a network to perform as at least one of: first means for creating or updating a shared field which is accessible by a plurality of users through a plurality of computers, respectively; second means for storing a shared-field context in a first memory area on the network, wherein the shared-field context describes at least one of features of the shared field, the features are caused within the shared field by inputs from the users accessing the shared field or by interactions among the plurality of users; third means for storing a user context as well as a reference in a second memory area on the network, wherein the user context is a context which is unique to a user operating one of the accessing computers and is caused within the shared field by an input from the operating user or by the interaction associated with the operating user, and the reference is usable for referring to the first memory area; and fourth means for leading each of the plurality of users to obtain, through an arbitrary one of the computers, the user context of himself/herself stored in the second memory area or the shared-field context of the shared field, which the user accessed, by the use of the reference stored in the second memory area.

According to one aspect of the present invention, when interactions are carried out among a plurality of computers in a shared field, its shared-field context and the user contexts of the users accessing the shared field are stored on a network, and each user may refer for them through the network. Therefore, from everywhere, everybody always can refer for and inspect: a shared field used for the interaction by himself/herself; the details of the interaction; if there exist various share fields on the network, a tendency of kind of the interaction carried out on each shared field; and so on. In addition, with reference to those contexts, one can track a place where users come together and a place where the users act.

Furthermore, since user's interactions and changes of shared fields caused by the interactions are stored as contexts on the network, it is possible to effectively use those contexts as intelligences on the network. For example, when a game is carried out by a plurality of users accessing a share field, the contexts upon the game may be held as resources on the network. Besides, on the basis of those contexts, it becomes possible to support a communication between users and to lead a user to a shared field where a discussion desired by the user is held.

DETAILED DESCRIPTION OF THE PREFERRED EMBODIMENTS

An exemplary embodiment of a network system according to the present invention is described below, with reference to drawings.

In this embodiment, there is illustrated the network system on which a plurality of network computers operated by a plurality of users, respectively, exist as nodes of a network, and the nodes of the computers of the same kind create, in conjunction with each other, shared fields (communities) each of which makes sufficient use of its participation-based development property without any restrictions.

As a network-connected computer operated by a user, various kinds of instruments such as a stay-at-home or desktop computer, a portable or mobile computer, a game console, and so on, may be used. This embodiment employs game consoles each of which is equipped with a network controller function.

[Structure of Game Console]

The game console according to the present embodiment comprises, as hardware resources, controller devices including a processor, a semiconductor memory accessible by the processor, input devices including but not limited to a camera, a microphone and a keyboard, output devices including but not confined to a printer and a display, an external storage device, and an input/output interface unit, which controls data input/output between the above-mentioned controller devices and the above-mentioned input devices, the output devices and the external storage device as well as other computers connected to the network and so on.

Figure 1:
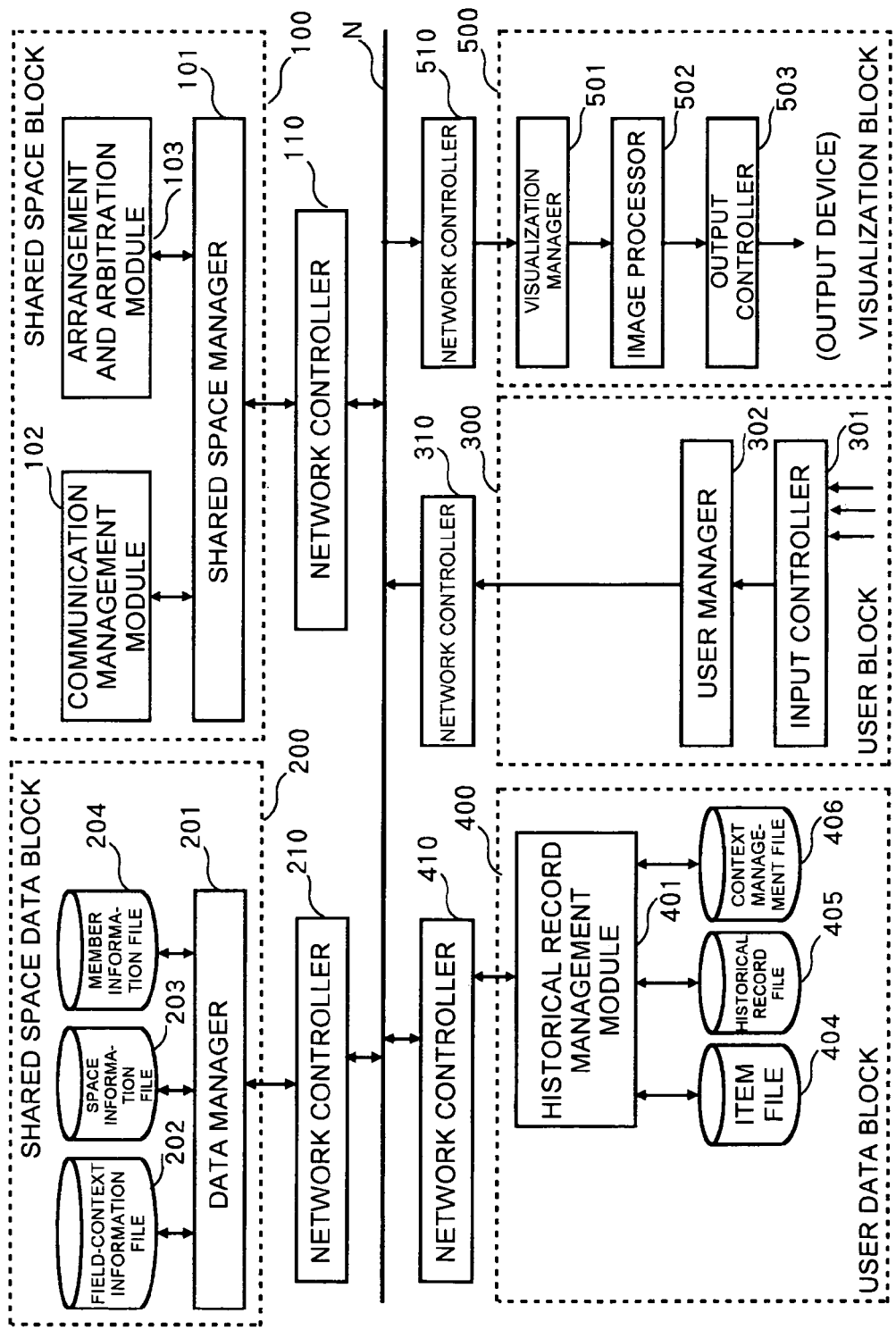
FIG. 1 is a block diagram showing a game console which is used for an embodiment of the present invention.

Exemplary functions formed on each game console are shown in FIG. 1. When the above-mentioned processor loads a predetermined computer program into, for example, the above-mentioned semiconductor memory and executes the program, the game console constitutes a shared space block 100, a shared space data block 200, a user block 300, a user data block 400 and a visualization block 500, wherein the term "shared space" is also referred to as "SS".

Preferably, these blocks 100 to 500 are always in available states but may be in available states in response to user's operation detected by the use of the input device or in response to instructions from other computers connected to the network. In short, they may selectively enter the available states.

Each game console does not necessarily have all of the above-mentioned blocks 100 to 500 but may be only one of the blocks. In other words, the blocks 100 to 500 may be located as individual nodes on the network and may have the respective assigned, unique addresses. However, if a user has intention of active access to the network, the game console of the user is required to comprise at least the user block 300.

The blocks 100 to 500 are connected to a global network N such as the Internet through the respective network controllers 110, 210, 310, 410, 510, which are described later. FIG. 1 shows the illustration where each of the blocks has its own network controller. However, the aim of the illustration is to indicate the blocks 100 to 500 are operable separately from each other; the network controllers are not necessarily provided for the blocks one by one. In other words, in case of a game console having a plurality of blocks, the present invention may be carried out even if only a single network controller is provided for the game console. In addition, a game console consisting only of a network controller with no block is allowable, wherein necessary blocks are constituted in the game console in accordance with handling a query by the network controller as mentioned later.

The blocks are as follows. The shared space block 100 manages in cooperation with the shared space data block 200, a shared field which is a shared space on the network where it interacts with another computer connected to the network. To the end, the shared space block 100 comprises a shared space manager 101, a communication management module 102 and an arrangement and arbitration module 103, wherein the shared space manager 101 is adapted to carry out processes relating to creation, deletion and update of a shared field, the communication management module 102 is adapted to control steps or processes of interactions including communications with another computer connected to the network, and the arrangement and arbitration module 103 is adapted to arrange, for example, objects existing on the shared field and to arbitrate between activities of the objects.

The network controller 110 handles, to create the shared space block 100 and the shared space data block 200, a query which is a request to create a shared field and is issued from another computer.

For example, "query" includes search keys for an image, a game title (texts), a GPS information piece indicative of a location of a game console, a real world, a virtual world formed by a game, a scene in a program, and an identification of the shared field already recognized. "Query" also includes parameters for creation, deletion and update of a shared field, ex. parameters defining rules or requirements.

Through the network controller 101 to the shared space data block 200, the shared space manager 101 transmits digital information pieces which are produced on the shared field created or updated by the block and are caused by interactions held within the shared field. The shared space manager 101 sends an information piece enabling access to the shared field such as an address of the game console managing the shared field, wherein the destination of the sent information piece is a computer which issued the query or another computer which is addressed by the query.

Furthermore, in response to a request from another computer, the shared space manager 101 sends to the network N the digital information pieces held in the shared space data block 200.

An example of the rules relating to creation of shared field is a rule where a shared field is created upon the receipt of even one query or where a shared field is created only upon the receipt of a plurality of queries of the same kind. An example of the rules relating to deletion of shared field is a rule where a shared field is deleted upon the last user leaves the shared field. An example of the rules relating to update of shared field is a rule where, if a query has a predetermined assessment value, the game console of the user which issued the query is invited to participate in the shared field.

An example of assessment values of queries is a degree of resemblance between a query assessed and the already-existing query or a degree of coincidence between the real world and the virtual world created; its assessment criteria is whether the query's value satisfy a required value which is one of the above-mentioned requirements. Alternatively, another rule is considerable where only users having specific keys are invited to participate therein. In addition, if the identification of the shared field where users played before is selected as a key, it is possible to create a new shared field in which only the users known to each other on the particular previous shared field are allowed to particulate.

In addition, the shared space block 100, if necessary, may serve or function as a server for other computers connected to the network. In that case, a server function is implemented on the network controller 110 or the shared space manager 101.

In combination of the techniques according to the present invention and the existing techniques to provide games with predetermined billing processes, the server function enables that, in a virtual-world based game, a specific place within the game may be selected and used as a shared field, or that, in a match based game, a match play is held on a shared field. In this event, tracking the identification of the shared field enables to inspect where users come together and play the game.

The shared space data block 200 manages, in cooperation with for example the shared space block 100 which a link instruction indicates, various kinds of information occurring in the shared field. To be more specific, the shared space data block 200 comprises a data manager 201, which carries out adding information generated in the shared field to an information file, reading out the information out of the information file, updating or deleting the information, and so on.

The data manager 201 manages the above-mentioned information by the use of a plurality of information files which is formed in, for example, the foregoing external storage device. The information files managed by the data manager 201 are, for example, a field-context information file 202, a space information file 203 and a member information file 204; the kinds of information recorded in those information files are described afterwards.

The user block 300 provides, in cooperation with the user data block 400, a function to control an interaction between a user operating the user block 300 and another user operating another computer connected to the network. In detail, the user block 300 comprises an input controller 301 and a user manager 302, wherein the input controller 301 receives information data including but not confined to a user identification input from the user operating the block 300 or an video or an image input from outside through the input/output interface; user identification is also referred to as "UID."

The user data block 400 manages, in cooperation with for example the user block 300 which a link instruction indicates, information data concerning the user operating the aforementioned user block 300. In more detail, the user data block 400 comprises a historical record management module 401 adapted to manage historical records of interactions, which include but not confined to user contexts representing the details of interactions among users.

Items to be used or already used in a shared field are recorded into an item file 404, wherein "item" means data required to represent the item, and concrete examples of "item" are picture and movie data files exchanged between users as well as object data files unique to the game which user played within the shared field. The historical records of interactions between users within the shared field are recorded into a historical record file. "User context" explained herein includes, for example, information which is the details of user's activities in the field, user's experiences of impression, sympathy and satisfaction, kinds of objects appearing on the field, and so on. User contexts are recorded into a context management file (or user context file) 406 together with identifications of the respective users. If a user context has a relation with an object, a reference for the object data representing the object is also recorded into the user context file 406.

Figure 2:
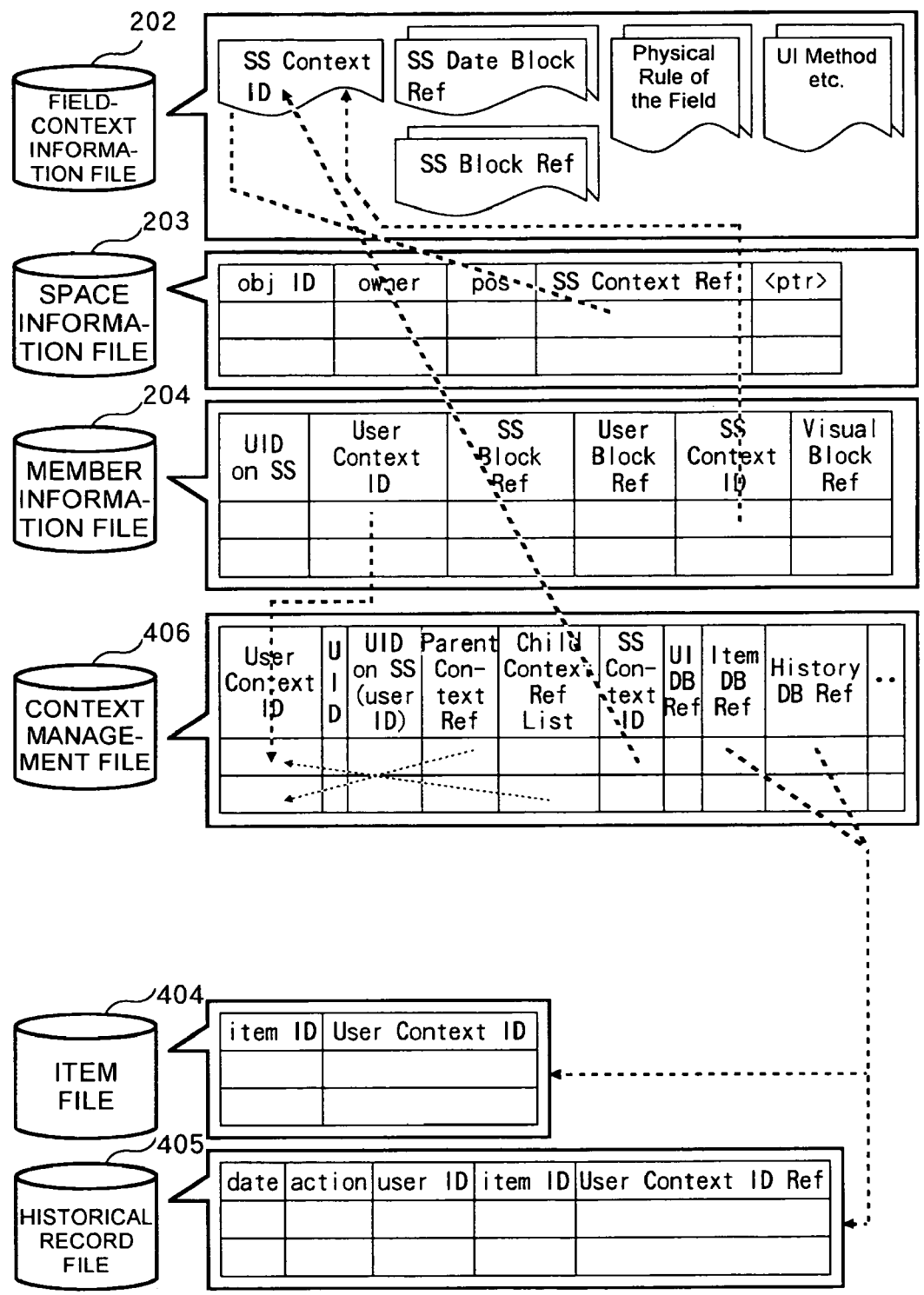
FIG. 2 is a view showing information examples managed by the game console and the relationship among them.

FIG. 2 shows information examples of the field-context information file 202, the space information file 203, the member information file 204, the context management file 406, the item file 404 and the historical record file 405, where broken lines in the drawing depict mutual links between corresponding contents.

Into the field-context information file 202, digital information pieces generated as examples of the shared-field context on the shared field are recorded in a list form, wherein the digital information pieces include, for example, an identification of the field (shared space) and a reference for an information file that contains information of a user participating in the field, a block of a console used for the participation by the user and an interaction carried out by the user; identification is also referred to as "ID", identification of field (shared space) is also referred to as "SS context ID", the list identified by "SS context ID" is also referred to as "shared space list", reference is also referred to as "Ref", and the reference for the above-illustrated information file is also referred to as "SS data block Ref."

Into the field-context information file 202, "field-attribute" is also recorded as another example of the shared-field context. An example of "Field-attribute" is an immutable rule defined to the shared field, while another example thereof is a variable rule varying in correspondence with the contexts of the participant members (users), behavioral contents of the member in the shared field, features derived from other shared field. To be more specific, it is a rule such that something flies when an item is hit, or a physical rule such as existence/inexistence of gravity in the shared field and power of wind.

For example, into the space information file 203, representation embodiments of objects configured in a space of a shared field which is a target of management are recorded as space information. The illustration of FIG. 2 records, as space information, identification of object (obj ID), owner type (owner) showing whether the object belongs to a particular user or to the shared field, positions indicative of logical address and expanse of a shared field (pos), reference for shared-field context (SS Context Ref), and objects data file including polygon or texture representative of objects or pointers or links indicative of memory area on which the polygon or texture exists.

For example, into the member information file 204, identification of the user participating as a member in the shared field which is a target of management (UID on SS), identification of user context (User Context ID), reference for shared space block of the game console which the member (user) operates (SS Block Ref), reference for user block which the member (user) operates (User Block Ref) and so on, are recorded as member information about each member in a list form. By tracing the references listed up, the block of the game console which the member (user) in question operates is identified. In the following explanation, the list of each member is also referred to as "context list."

For example, into the context management file 406, references or links for digital information pieces concerning contexts generated in a shared field are recorded, wherein the digital information pieces include but not confined to identification of use context (User Context ID), user identification (UID, UID on SS), management information pieces showing the respective relationships (vertical or horizontal relationships) between a plurality of shared fields, between a shared field and a game console or block and between game consoles or blocks.

Into the item file 404, identifications of items which users used in a shared field (item ID) and identifications of user contexts (User Context ID) are recorded.

In the historical record file 405, user contexts including but not confined to historical records of actions or communications are recorded. For example, when a user carried out an action in a shared field, a data, an identification of an action (action), an identification of the user (user ID), an identification of the item used upon the action (item ID), a reference for the user context (User Context ID Ref) and so on are recorded in the historical record file 405.

Turning back to FIG. 1, the visualization block 500 is a block adapted to visualize various kinds of digital information pieces obtained from the network N in view of each node where the block exists. The visualization block 500 comprises functions of a visualization manager 501, an image processor 502 and an output controller 503. The output controller 503 is adapted to output an image obtained by performance of the image processor 502, wherein the destination of the image is a monitor, a retainer media, a printer, or the like.

An example of the digital information piece to be visualized is a data set representative of a phenomenon occurring at each shared field, an object uploaded to each shared field, a shared-field context, a user context or the like. These digital information pieces can be obtained by broadcasting its request through the user block 300 to other computers connected to the network N, which are for example but not limited to the shared space block (shared space management block) 100, the shared space data block (shared space management block) 200 and the user data block 400.

The visualization manager 501 identifies the relation between a source node of the obtained digital information piece and another node of the user block 300 requesting to send out the digital information piece, wherein the identification process is carried out based on, for example, management information recorded in the context management file 406 or a combination of the management information and routing information which is described later. Then, the visualization manager 501 carries out conversion from the obtained digital information piece to a for-display data set which is suitable for a particular view depending on the identified relation.

The conversion schemes to for-display data sets on the visualization manager 501 may be selectively changed in correspondence with its application employed.

For one application, the visualization manager 501 calculates route lengths of digital information pieces from the respective nodes on the basis of the above-mentioned management information and carries out the above-mentioned conversion process of the for-display data sets concerning the digital information pieces of longer route lengths with higher priorities. The term "route length" used herein is not limited to a physical length of a route on which a digital information piece is transmitted. For example, the route length may be determined by the number of nodes which a digital information piece has passed through. Transition path lengths on a time series may be used as route lengths. In case of the use of the transition path lengths on a time series as route lengths, the visualization manager 501 may convert, into a for-display data set with higher priority, an older digital information piece which the operating user therefore falls in near oblivion or another information piece which passed through more users.

For another application, the visualization manager 501 obtains information of access histories relating to a plurality of nodes from which the respective digital information pieces originate; the information pieces originating from the nodes with larger number of accesses are converted into the for-display data sets with higher priorities.

For still another application, a plurality of digital information pieces are sorted on the basis of relations with nodes on the network, which are of computers storing the information pieces; for-display data sets are so regulated that the sorted digital information pieces are displayed thereon simultaneously or near simultaneously and are arranged thereon in the sorted order which depends on the sort. The sort may be carried out on the basis of one of route lengths of the obtained digital information pieces or their dates/times of occurrence. Alternatively, the sort may be based on a prejudged relation such as the above-mentioned relation with node on the network, wherein quantification is performed on the relations in advance to create a predetermined table, and the prejudged relation is derived from the predetermined table. This alternative provides a visual expression where the whole network is likened to the universe such that each shared field looks as if to emit light and may be handled as a suitable image depending on its relative distance and its luminous intensity.

In the case where digital information pieces are sorted, the resultant for-display data sets may be so regulated that the lower the aforementioned relation of the digital information piece is, the smaller the displayed size of the digital information piece becomes. Alternatively, the resultant for-display data sets may be so regulated that the lower the aforementioned relation of the digital information piece is, the longer the relative distance of the displayed position of the digital information piece becomes with respect to a predetermined position on display. Instead, provided that a plurality of contents are held in advance with the respective weights dependent on their degree of abstraction, the for-display data may be so created that the digital information pieces with the lower relations are assigned the contents with higher degree of abstraction.

The image processor 502 converts the for-display data sets created or regulated as mentioned above into images to be output into a display monitor, a retainer media, a printer, or the like.

[Network Controller]

The positions (pointers) of the respective network controllers 110, 210, 310, 410, 510 on the network N are identifiable by, for example, their IP addresses. The network controllers 110, 210, 310, 410, 510 are able to, if necessary, hold routing information transmitted from an arbitrary node on the network N, and to broadcast the information to the nodes therearound. Each network controller 110, 210, 310, 410, 510 holds addresses of the respective neighboring nodes such as their IP addresses and, if the transmitted information is not addressed thereto, further transmits it to the neighboring node truly addressed. In this event, the network controller adds the records of the previous nodes and the record of itself into the transmitted information so that the added information is transmitted to nodes which the information has still not been.

The destination of the transmitted information is not limited to an address of a node. For example, its destination may be "SS Context ID" and "SS Block Ref", both of which are identifications of the shared field held on the shared space block utilizing the network controller, or may be "User Context ID" and "User Block Ref" both held by the user block. The routing information suitable to this end is obtained by a context access unit 115 as described later.

Figure 3:
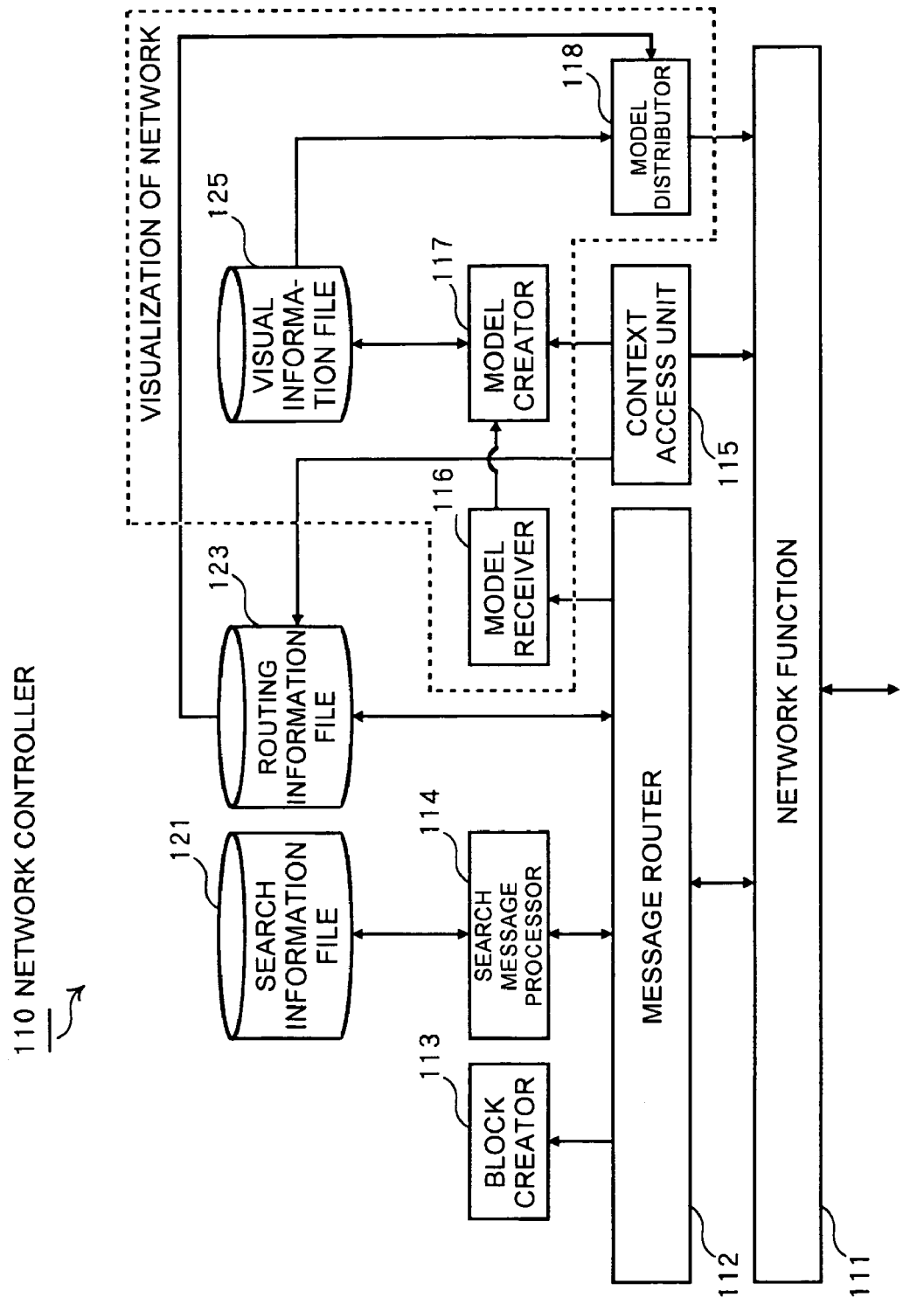
FIG. 3 is a block diagram showing a network controller connected to the game console.

The network controllers 110, 210, 310, 410, 510 have almost the same structures. Therefore, as a typical example, the structure of the network controller 110 is explained with reference to FIG. 3.

The network controller 110 comprises a variety of functions performed by the processor of the game console loading and executing the computer program, i.e. a known network function 111 enabling a bidirectional communication with the network N, a message router 112, a block creator 113, a search or query message processor 114, the context access unit 115, a model receiver 116, a model creator 117 and a model distributor 118.

Figure 4:
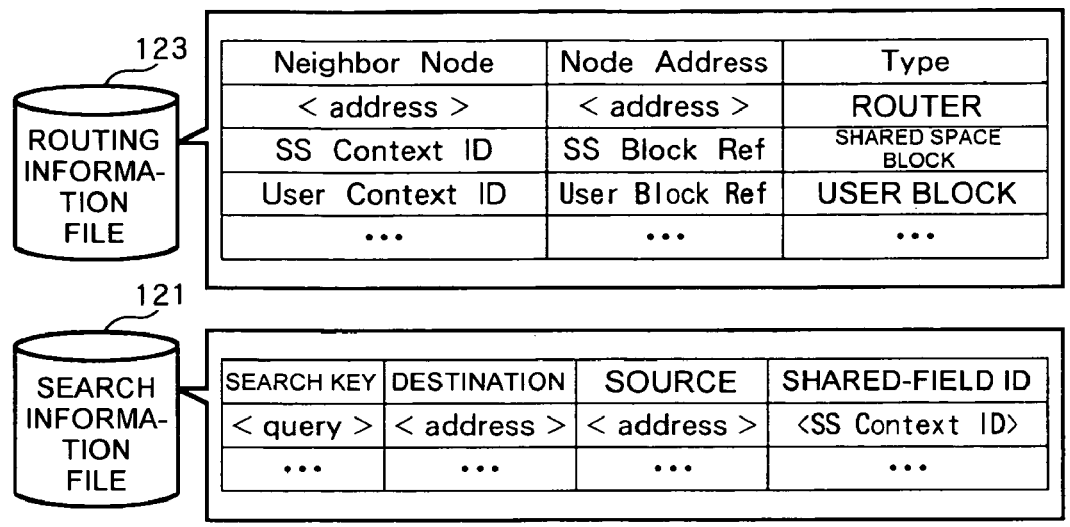
FIG. 4 is a view showing information examples managed by the network controller.

The message router 112 carries out a routing process based on a routing information file 123 which is illustrated in the upper part of FIG. 4. Into the routing information file 123, the neighboring nodes (represented as "Neighbor Node"), their addresses (represented as "Node Address"), types of the neighboring nodes (represented as "Type") are recorded as routing information; "Type" is for example "Router", "Shared Space Block" which is connected thereto through the network controller of the neighboring node, "User Block" and so on. The block creator 113 creates a needed block in response to a message which is generated inside/outside the game console.

The search message processor 114 receives a search message from the inside/outside of the game console and, if the received search message is coincident with the search information recorded into the search information file 121 illustrated in the lower part of FIG. 4, sends a creation message of the function block indicated by to the search message towards itself or towards the neighboring node identified by its source/destination information. The node which received the creation message creates the function block corresponding to the message by means of the block creator, adds the SS Context ID into the column of the shared space block included in the search information and sends the SS Context ID and the SS Block Ref back to the source. Likewise, every node, in accordance with which the SS Context ID is described in the column of the shared space block, sends the SS Context ID and the SS Block Ref back to the source upon the receipt of a query which is coincident with the search information.

If the received search message is not coincident with the search information, the search message processor 114 records the received search message as new search information into the search information file 121 and sends the search message to the neighboring node, wherein "search message" is for example a query or an object to which the address indicative of its destination is added.

Provided that the network controller 110 in question exists on the game console holding the shared space block 100 and the user block 300, the context access unit 114 shows the following functions:

(1) to obtain link information between contexts from the corresponding data block (shared space data block 200 or user data block 400), wherein the link information is required to create routing information about a route on which the query or the object model is transmitted; and (2) to obtain contexts necessary for visualization of the object model from the corresponding data block (shared space data block 200 or user data block 400).

The model receiver 116 receives object-model graphic information from its neighboring node. The model creator 117 creates its object-model graphic information and stores in a visual information file 125 a combination of the created graphic information and the graphic information received from the neighboring node. The model distributor 118 distributes the object-model graphic information towards the neighboring node on the basis of the routing information recorded in the routing information file 123.

Note here that, by means of the network controllers 110, 210, 310, 410, 510, the above-explained shared space block 100, shared space data block 200, user block 300, user data block 400 and visualization block 500 in the game console are recognizable as the devices independent of each other, seen from other computers.

Now, explanation will be made about operations of the system which is constituted by a plurality of users accessing the network N by means of the game consoles with the above-mentioned structures.

[Management of Shared Field]

Assume that a user posts a query into the network by means of the user block of its game console. The query relates to, for example, an object model which is a request by the user to create a shared field so as to recruit his/her party. The network controller 110 included in the game console connected to the network handles the query circulating on the network. Responsive to a block creation message based on the handle of the query, the block creator 113 of the node creates, if necessary, the shared space block 100 and/or the shared space data block 200 and passes the query to the shared space block 100. The passed query describes a request which requires creating a shared field even if the request is sent out from only one user. The shared space block 100 handles the query within the shared space manager and creates a shared field.

If a rule is that one should create a shared field when a requirement is met that it obtains from at least two user blocks 300 the queries equal to or similar to each other, the network controller 110 holds the obtained query as the search information until the above requirement is met; the network controller 110 creates a shared field upon obtaining the queries equal to or similar to each other.

After creating the shared field, the shared space block 100 sends back a shared-field ID usable for identifying the shared field and so on; the destinations of the shared-field ID and so on are the respective user blocks 300 which issued the queries used for creating the shared field. The shared space block 100 creates a shared-field context including information relating to users participating in the shared field. In addition, the network controller 110 having the shared space block 100 adds the user context IDs of the participant users and their references for the user blocks 300 into the routing information. When the user block receives the reply of the shared-field ID, the network controller having the user block adds, as routing information, the shared-field ID and its reference for the shared space block 100 into the routing information file 123. The addition of the routing information may be carried out upon the creation of the shared field or may be carried out by the context access unit accessing the shared-field context and the user context upon an access of the shared field or a particular view process, both of which will be described later.

[Access to Shared Field]

Figure 6:
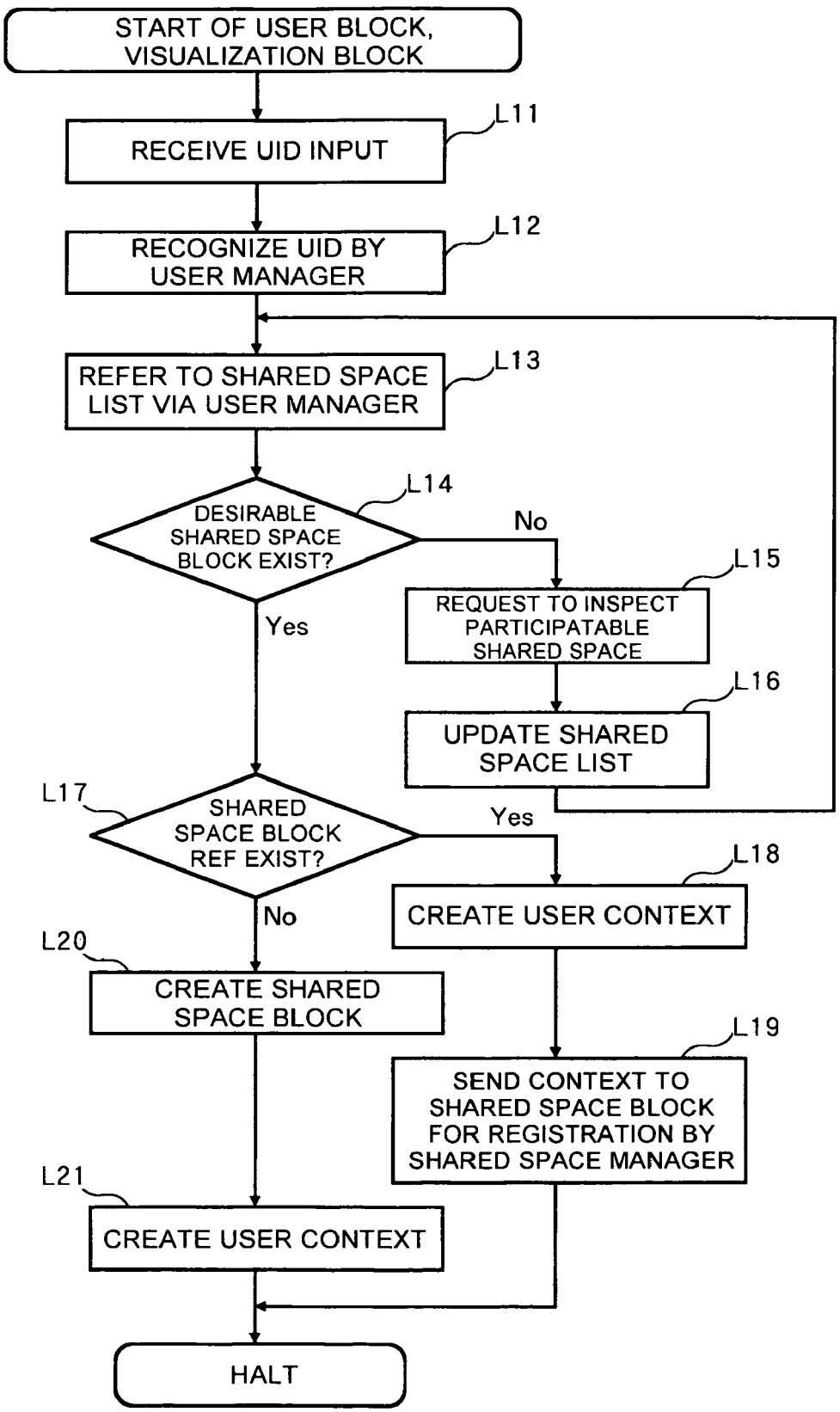
FIG. 6 is a flowchart showing steps or processes in order that a new user accesses the already-created shared field and interacts with the already-existing user who requests to create the shared field.

Now, explanation will be made about steps or processes in the case where a user different from the user requesting to create the shared field accesses the shared field created by the request and interacts with the latter user, wherein the former user is referred to as "new user" while the latter user is referred to as "already-existing user." FIG. 6 is a flowchart showing the steps.

The user block 300 of the game console operated by the new user shall investigate whether there exists a shared field which the new user is able to participate in. First, the user inputs his/her identification (UID) to use it by himself/herself (L11). The user block 300 recognizes the UID (L12) and provides the user with a shared space list which is a list of participatable shared fields or shared spaces; the list will be described later (L13). If there exists no desirable shared space in the shared space list (L14: No), the user block 300 requests to inspect another shared space (L15) and updates the list (L16) and goes back to the process of L13.

The request for shared-field inspection is carried out by transmitting a query on the network N. Similar to the case of the shared-field creation, "query" may include information for identifying the type or kind of the shared field, which includes but not confined to an image, a game title (texts), a GPS information piece indicative of a location of a game console, a real world, a virtual world formed by a game and a scene in a program. Also, a query may include all of them mentioned above. In both cases, for example, a rule for indicating the number of the transfers of the query is added thereto so that the inspection can be carried out for only a predetermined, limited region of the network.

The query posted to the network N is transferred on the basis of "neighborhood relation on the network" defined by the routing information and so on. Every time the search information including the description of the shared field suitable for the query is found out, the shared-field ID of the shared field is sent back to the user block 300. The shared field context is obtained on the basis of the shared-field IDs so that the above-mentioned shared space list is created within the memory of the user block 300.

Figure 5:
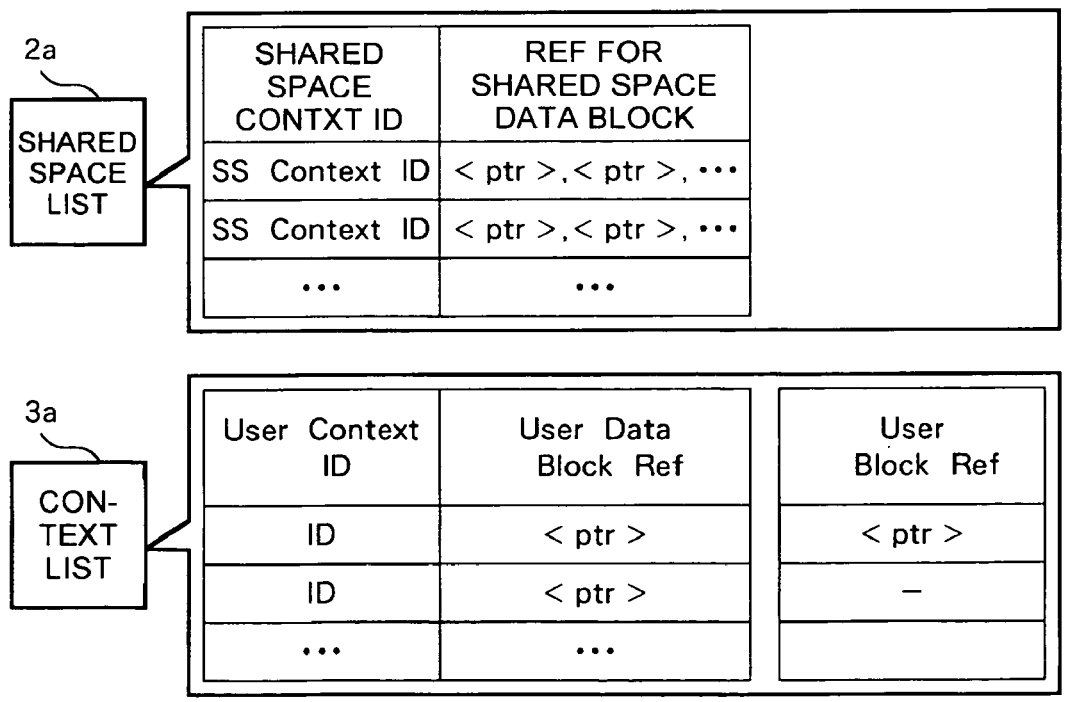
FIG. 5 is a view showing examples of a shared space list and a context list.

For example, the shared space list comprises the details illustrated in the upper part of FIG. 5. In the shared space list 2*a* illustrated in FIG. 5, context IDs for identifying the respective shared-field contexts (in the column of "Shared Space Context ID") and references for the respective data blocks of the shared fields (in the column of "Ref For Shared Space Data Block") are listed up; in the drawing, <ptr> represents "pointer." The shared space list 2*a* is an empty or null list in its initial state.

In the case where the shared field has already existed, the list includes the described references for the shared space blocks, as illustrated in the drawing. On the other hand, in the case where the shared field does not exist, the list has no description of the reference for the shared space block 100.

If the shared field which the user is able and desirable to participate in is found out by means of the shared space list 2*a* (L14: Yes), the game console inspects, by referring to the shared space list 2*a*, whether the shared space block reference exists (L17). If the shared space block reference is found out (L17: Yes), the game console creates its user context (L18) and sends the user context to the shared space block 100 (L19) in order that the shared space manager 101 registers the user context and creates or updates the context list 2*b* which has for example details illustrated in the lower part of FIG. 5.

The context list 2*b* lists up therein the user context IDs of the respective users participating in the shared field, the references for the user data blocks and the references for the user blocks.

If there is found out no shared space block reference (L17: No), the game console newly creates a shared space block 100 (L20) and creates the user context (L21) to lead the shared space block to register it.

Figure 7:
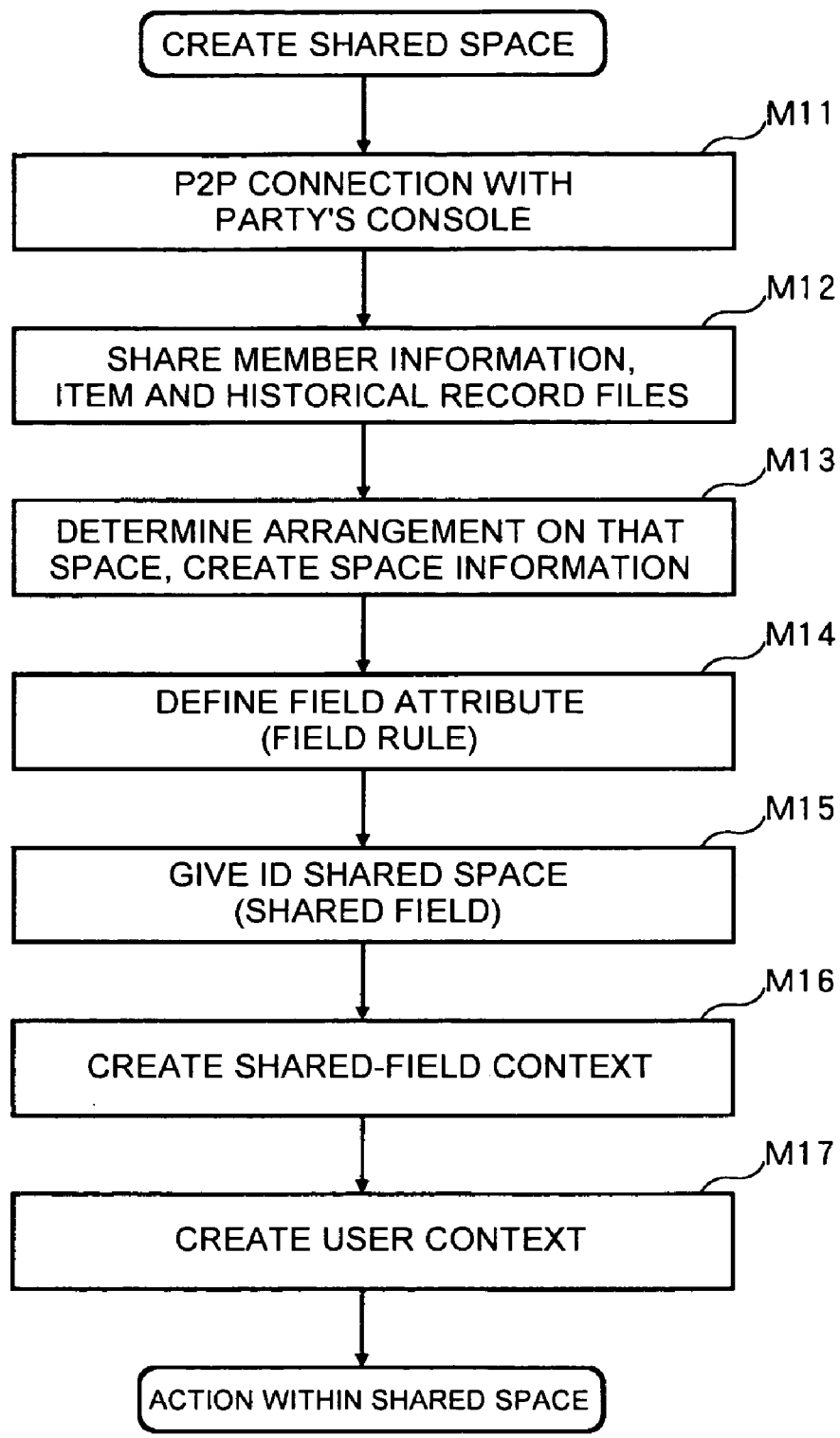
FIG. 7 is a flowchart showing steps or processes upon creation of a shared space by the game console which is operated by a user.

Steps or processes upon creation of a shared space by a game console operated by a user in cooperation with party members identified based on registrations of user contexts are as shown in FIG. 7.

With reference to FIG. 7, the game console establishes and carries out a P2P connection with other game consoles of the party members (M11) and, then, creates a shared field in cooperation with the game consoles of the party members and shares the contexts of the member information files, the item files, the historical record files and so on (M12). In more detail, the game consoles transmit the contexts mutually to each other and, if necessary, update their own item files 404 and historical record files 405.

The arrangement and arbitration module 103 determines an arrangement of objects within a space of the shared field and creates the above-explained space information (M13). The communication management module 102 defines field attributes (field rules and etc.) (M14). In this event, the field attributes may be selected and determined, by the users, from contexts or predetermined rules recorded in the party members' game consoles. After that, identification is given to the shared field (M15), and the shared-field context is created (M16), as well as the user context is created (M17). When the shared field is thus created, it becomes possible to carry out a variety of actions within the shared field.

Figure 8:
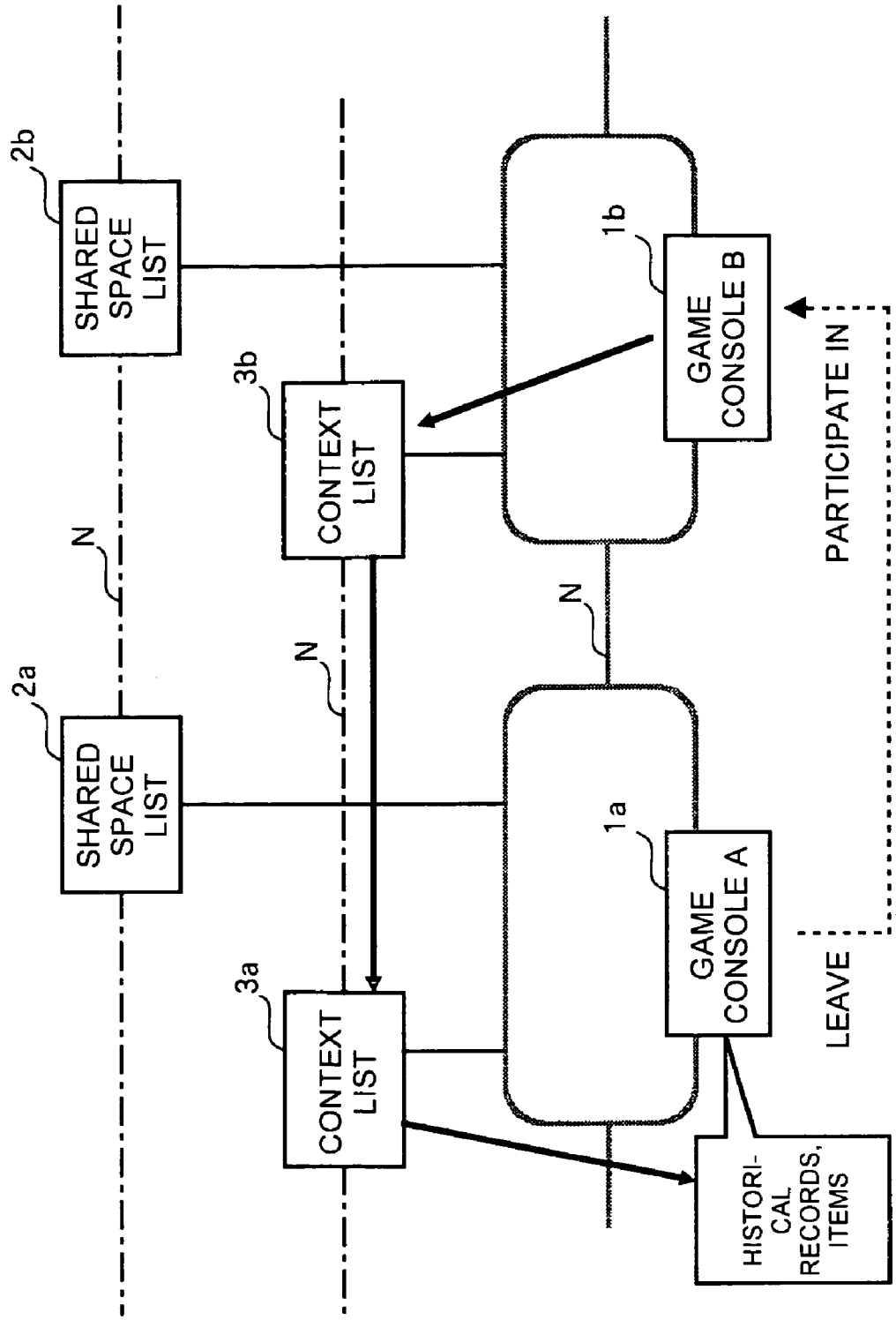
FIG. 8 is a view showing an event where a user leaves the current shared field and participates in another shared field.

A user is allowed to leave the shared field in which the user currently participates and, in turn, to participate in another shared field. Even if a user leaves the previous shared field and participates in another shared field, the context of the previous shared field can be made effective. FIG. 8 shows an example where a user first participates in a shared field by using a game console A (1*a*) and, then, leaves the shared field and participates in another shared field on the network N by using another game console B (1*b*).

In the illustration of FIG. 8, shared space lists 2*a*, 2*b* as well as a plurality of context lists 3*a*, 3*b* . . . are distributed on the network N. The user can use the game console B and can find out, through the inspections of the lists 2*a*, 2*b*, 3*a*, 3*b*, the shared field which the user previously participated in and the previous game console A which the user used on the previous shared field. In addition, the user also can refer to the contexts recorded in the game console A, for example, historical records and/or items.

Figure 9:
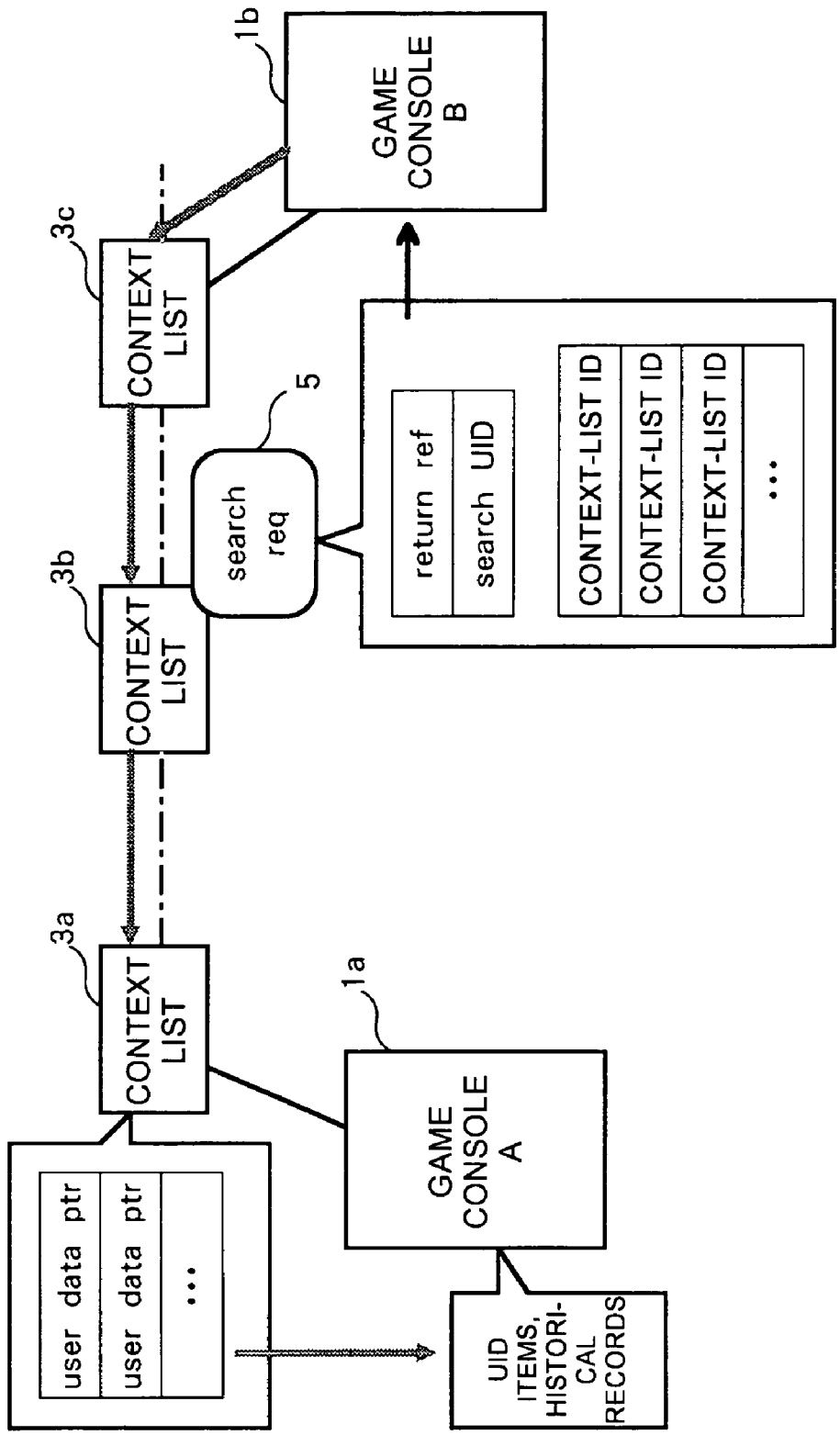
FIG. 9 is a view showing an event where a user refers to contexts held on a game console, which the use used before, by the use of another game console.

The user also can refer to the contexts concerning the previous shared field without access thereto. FIG. 9 shows an event where the user directly refers for the contexts concerning the game console A.

When the user leaves the shared field in which the user participates by means of the game console A, the user records the UID (User ID), the Items, the historical records into the respective predetermined files. In this event, the user also registers a pointer (ptr) of the game console A into a context list 3*a*. The context list 3*a* may exist on the shared space block of the game console A or on another game console.

Thereafter, the user issues a search request of the context list 3*a* which was used for the previous registration by the user, by means of the game console B; the search request is issued for the closest context list 3*c*. For example, into the context list 3*c*, the address of the neighboring context list 3*b* and its context list ID are recorded, similar to the shared space list. If the search request is not addressed to the context list 3*c*, the context list 3*c* transfers the search request to the context list 3*b* which has the neighboring address with respect to the context list 3*c*.

Each of the context lists 3*a*, 3*b* adds its context list ID to the search request when the search request passes through the context list 3*a*, 3*b*. Then, the context lists transfers the search request to its neighboring context list which the search request has not been passed through. Thus, the user can refer to the historical records, the items and so on which are recorded in the game console A.

[Example of Context Management]

Figure 10:
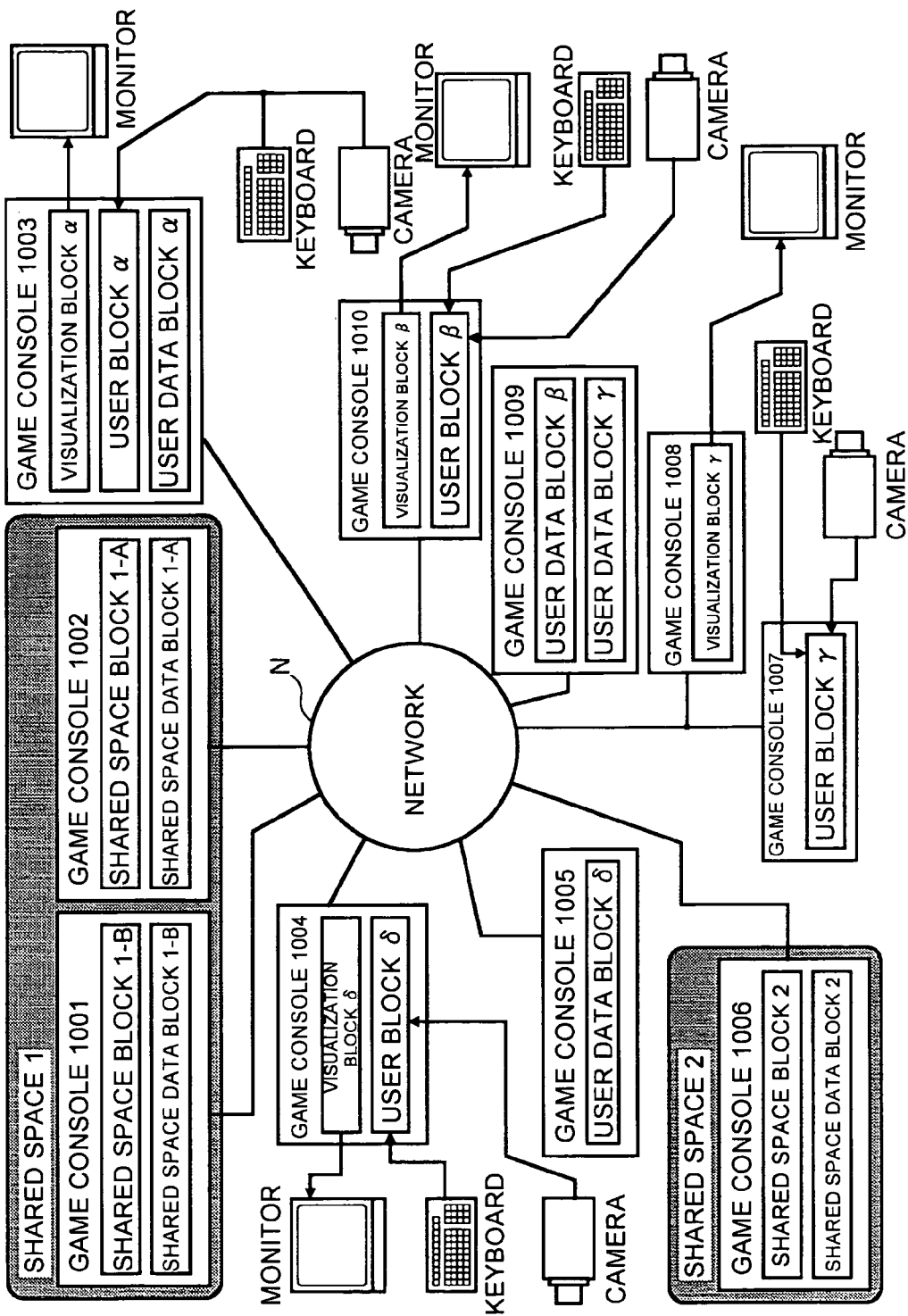
FIG. 10 is a general view showing a network system on which context management according to an embodiment is carried out.

Next, concrete explanation will be made about an example of context management on the network system according to the present embodiment. FIG. 10 is a general view showing the network system. To the network N, a plurality of game consoles 1001 to 1010 operated by users are connected through the respective network controllers each comprising the structure illustrated in FIG. 3.

In the figure, the illustrated blocks as included in the game consoles are in their available states on the respective game consoles. Each user can use all blocks 100 to 500 on the game console operated by the user and can also use blocks on another game console through the network N.

There are two currently-active shared spaces (shared fields), i.e. a shared space 1 and a shared space 2. The shared space 1 was created by two game consoles 1001, 1002. The shared space 2 was created by only a game console 1006. The symbols "α", "β", "γ", "δ" are used for distinguishing four users accessing the network system. For example, the visualization block α, the user block α and the user data block α are blocks used by the user α. The same manner is applied to the other blocks illustrated. Each of the visualization blocks is connected to a monitor having a display. Each of the user blocks is connected to input devices such as a keyboard and a camera.

Now, with reference to FIGS. 11 to 25, explanation will be made about changes in status of the network system structured as described above; the changes occur upon the accesses of the users α to δ to the network system.

In the initial state, there exists neither shared space block 100 nor shared space data block 200. Only the network controller 110 exists on the game console.

Figure 11:
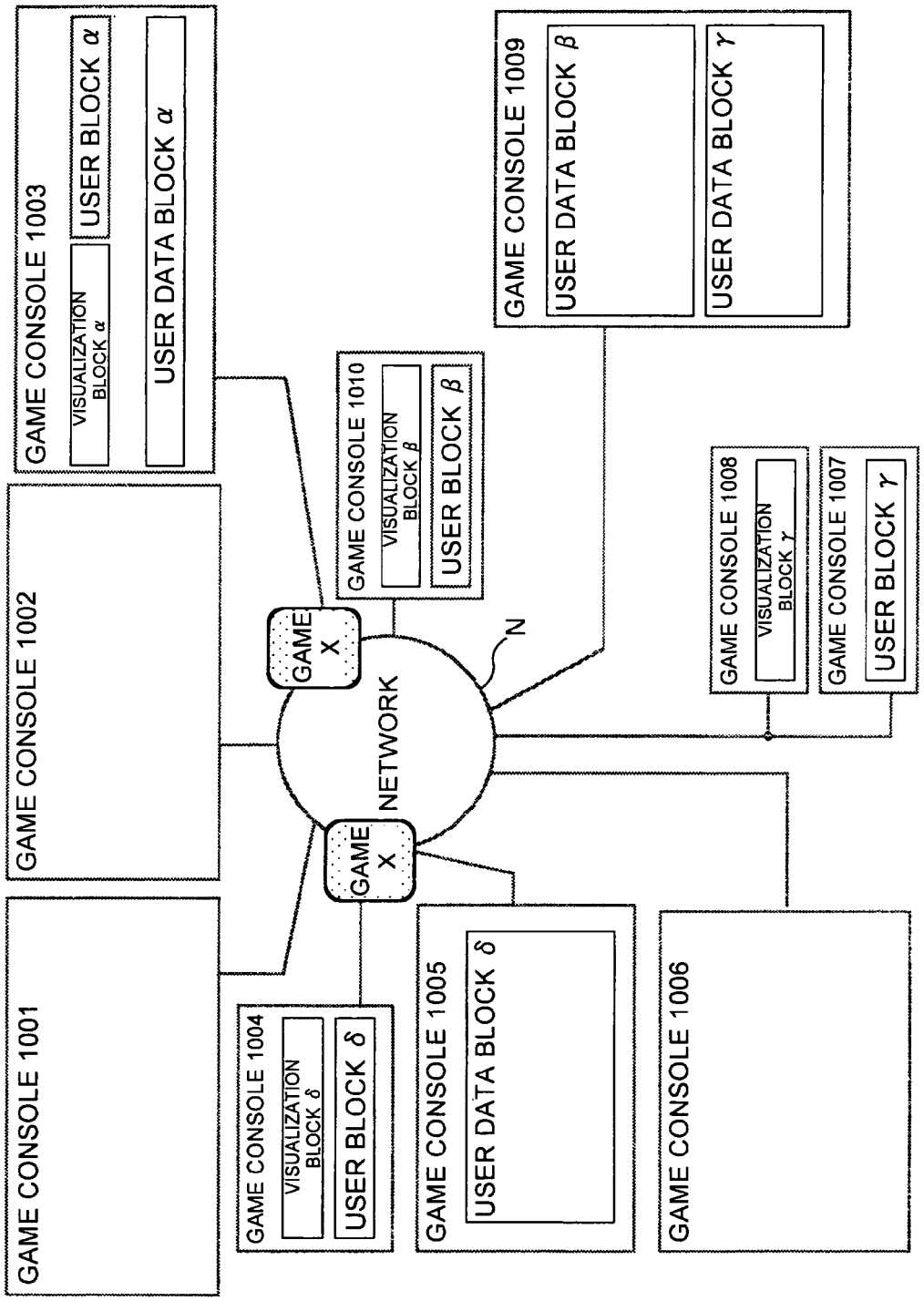
FIG. 11 is a network view showing an event where a user α newly creates a shared field to hold a game X together with a user δ.

FIG. 11 shows a status where the user α newly creates, together with the user δ, a shared field for carrying out a game X. In FIG. 11, the user α and the user δ send out keywords to create the shared field 1 on the network N by means of the game consoles 1003, 1004 which they operate, respectively; the example of the keyword transferred is its game title "Game X."

Figure 12:
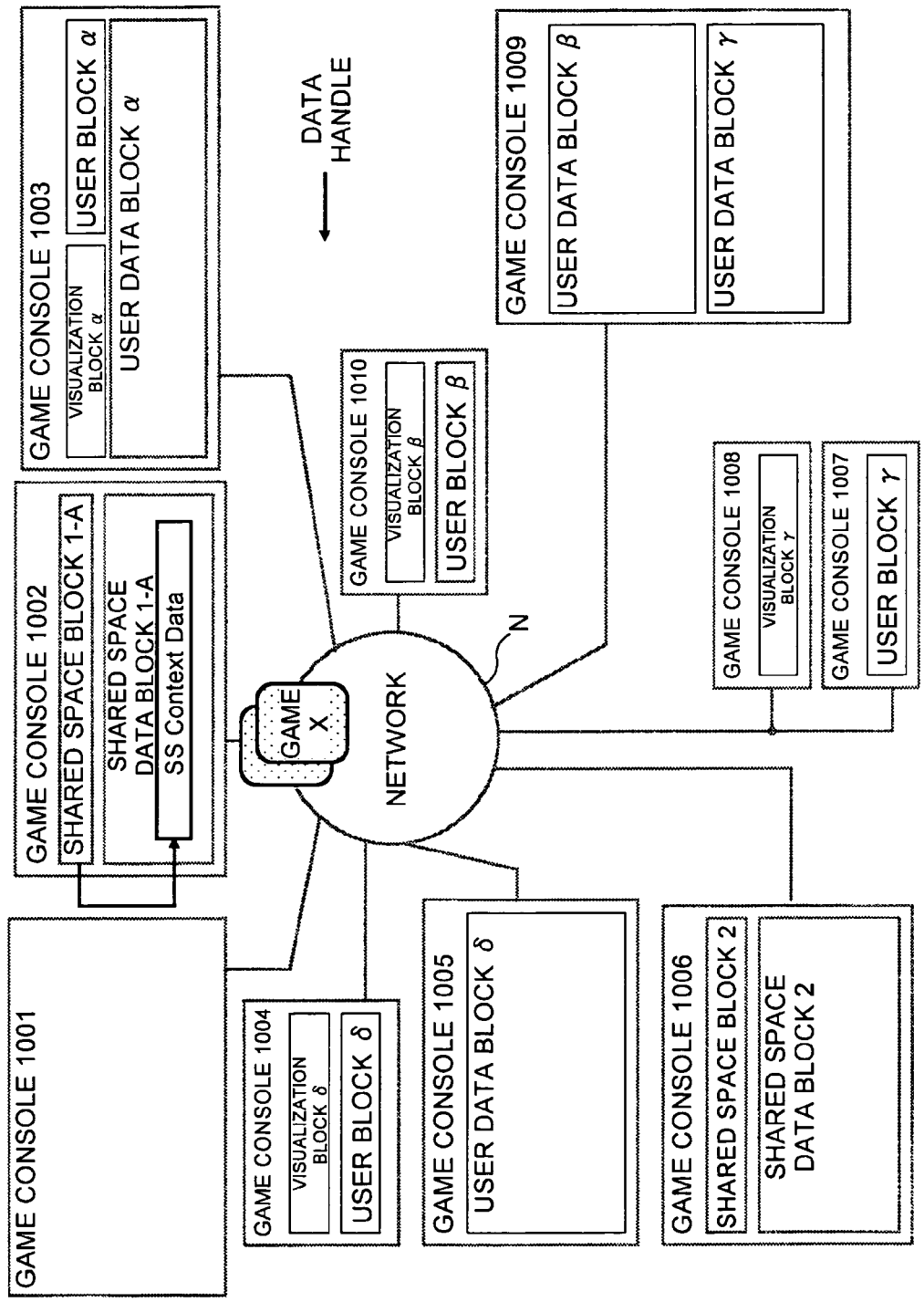
FIG. 12 is a view showing a shared space block upon new shared field creation.

The state of the network system changes as shown in FIG. 12. In FIG. 12, the shared space block 1-A of the game console 1002 receives the keyword transmitted on the network N, creates the shared field 1 for the game X and the context of the shared field 1 and records the context (SS Context Data) into the shared space data block 1-A. The shared space block 1-A transmits, to the user block α and the user block δ, an ID (SS Context ID) of the shared field 1 created at that time and the reference for the context of the shared field 1. In the field-context information file 202, a field-context is set in correspondence with the creation of the shared field 1 by means of the shared space block 1-A, as shown in the upper part of FIG. 21.

Figure 21:
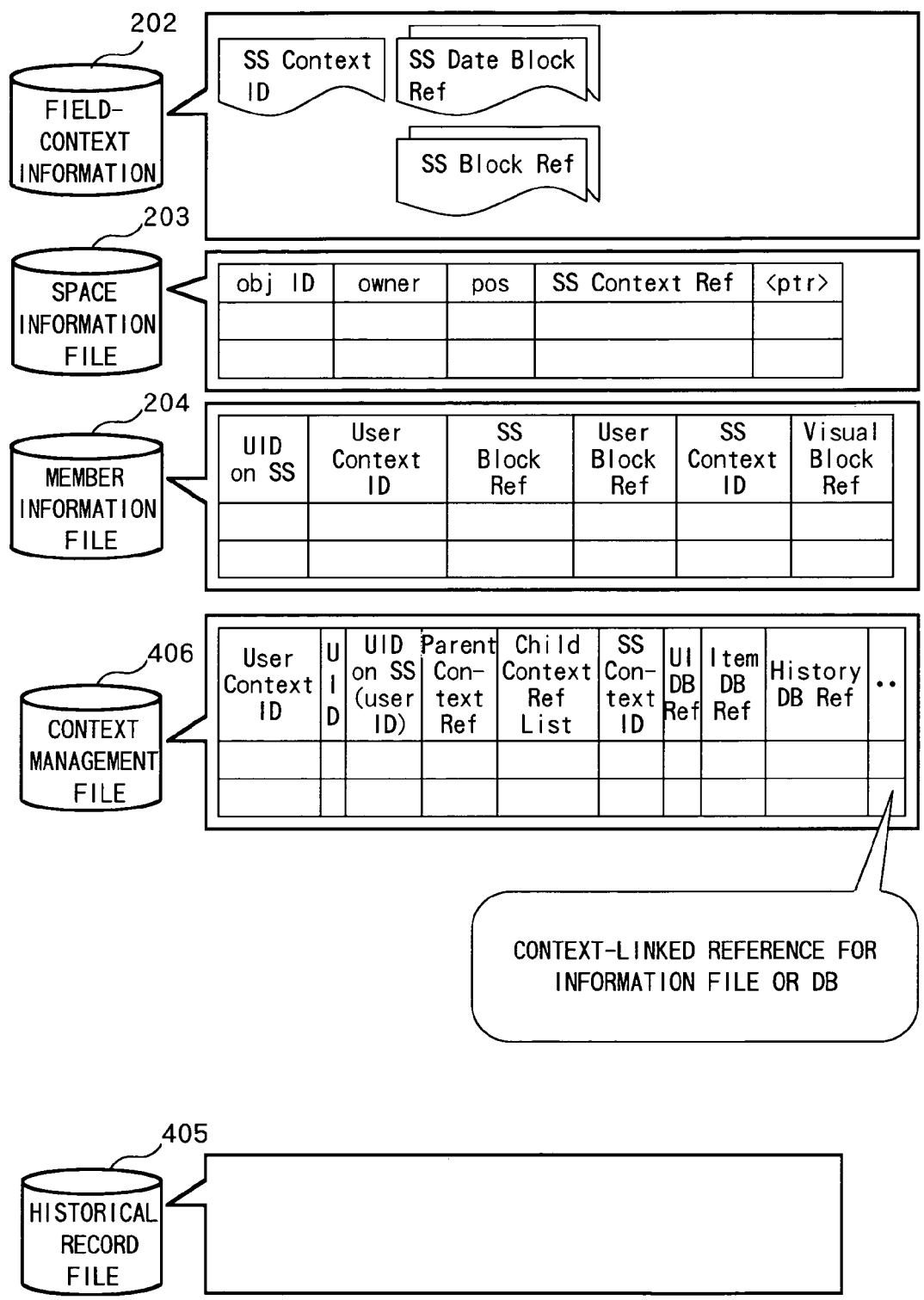
FIG. 21 is a view showing states of information files on the network system.

In FIG. 21, the context management file 406 is provided with a column for recording references to DB (database or information file) linked to the contexts, for example, pointers (ptr) for the record file concerning a game score or the like.

Figure 13:
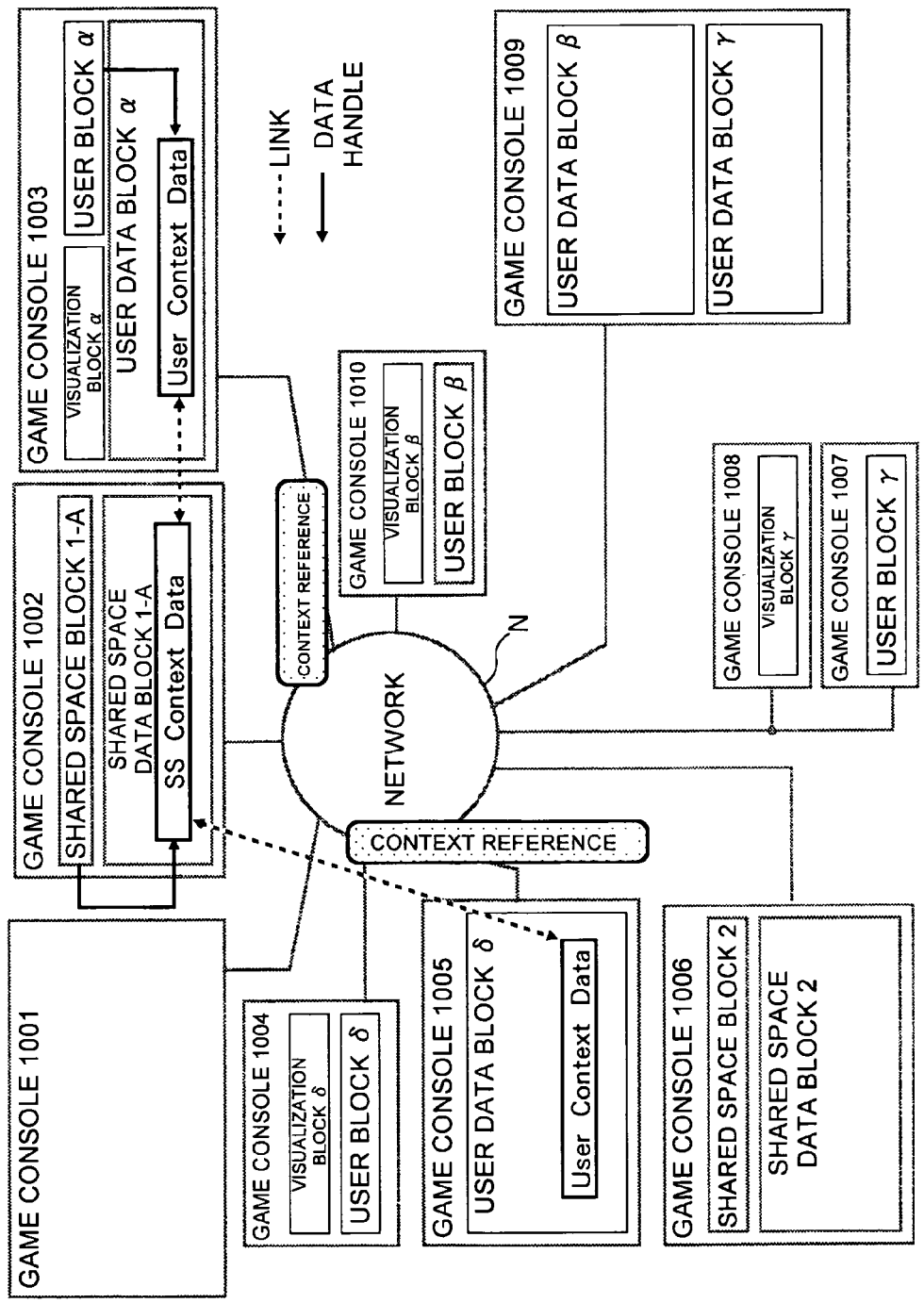
FIG. 13 is a view showing user blocks α, δ upon receipt of a share-field ID.
Figure 22:
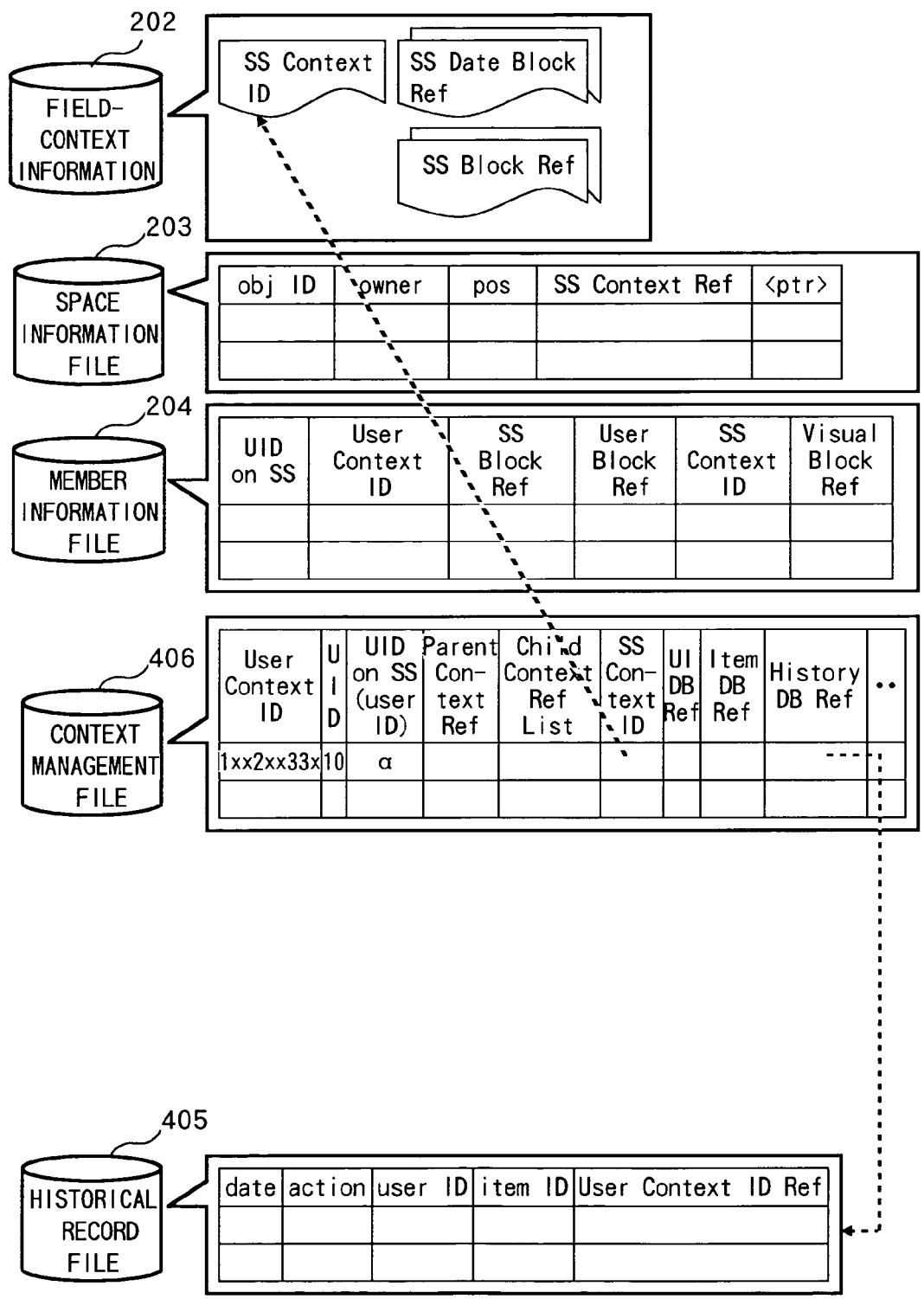
FIG. 22 is a view showing other states of information files on the network system.
Figure 23:
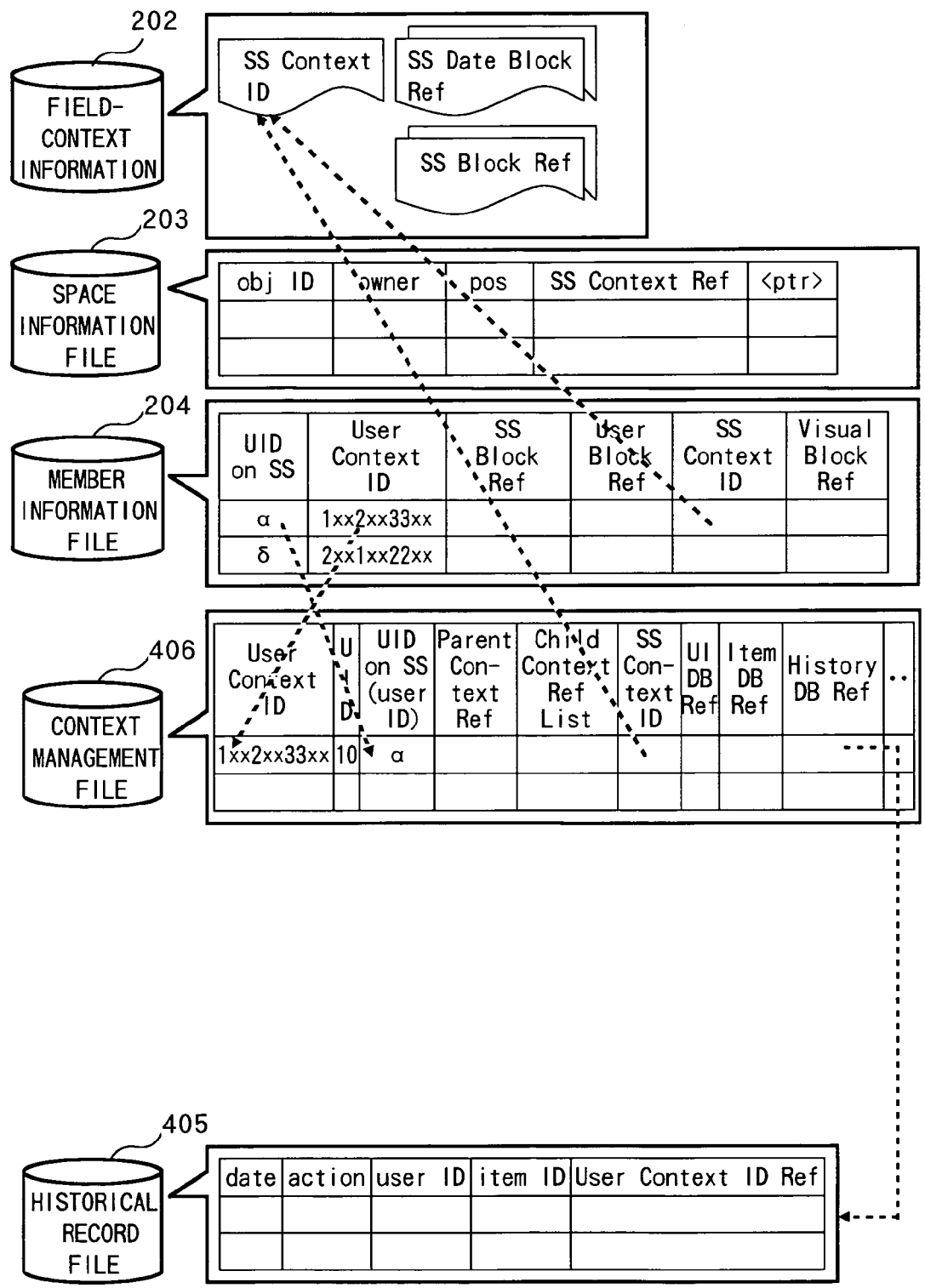
FIG. 23 is a view showing other states of information files on the network system.

When the same IDs of the shared field 1 arrive at the user block α as well as the user block δ, the status of the network changes as shown in FIG. 13. Based on the received ID of the shared field 1, the user block α creates a user context (User Context Data) and records it into the user data block α. The user block α also creates a corresponding entry within the context management file 406 to define the reference for the shared field 1. FIG. 22 shows the status. Similar to the user block α, the user block δ creates a user context (User Context Data) and records it into the user data block δ of the game console 1005. The shared space block 10A defines the references for the user contexts. Thus, the context of the shared field 1 (SS Context Data) and each of the user contexts (User Context Data) are linked with each other. The shared space block 1-A creates member information based on the information received from the user block α and the user block δ and records them into the member information file 204. The user block α records its historical records into the historical record file 405 of the user block α. FIG. 23 shows that status; the broken lines represent the linked data sets.

Figure 24:
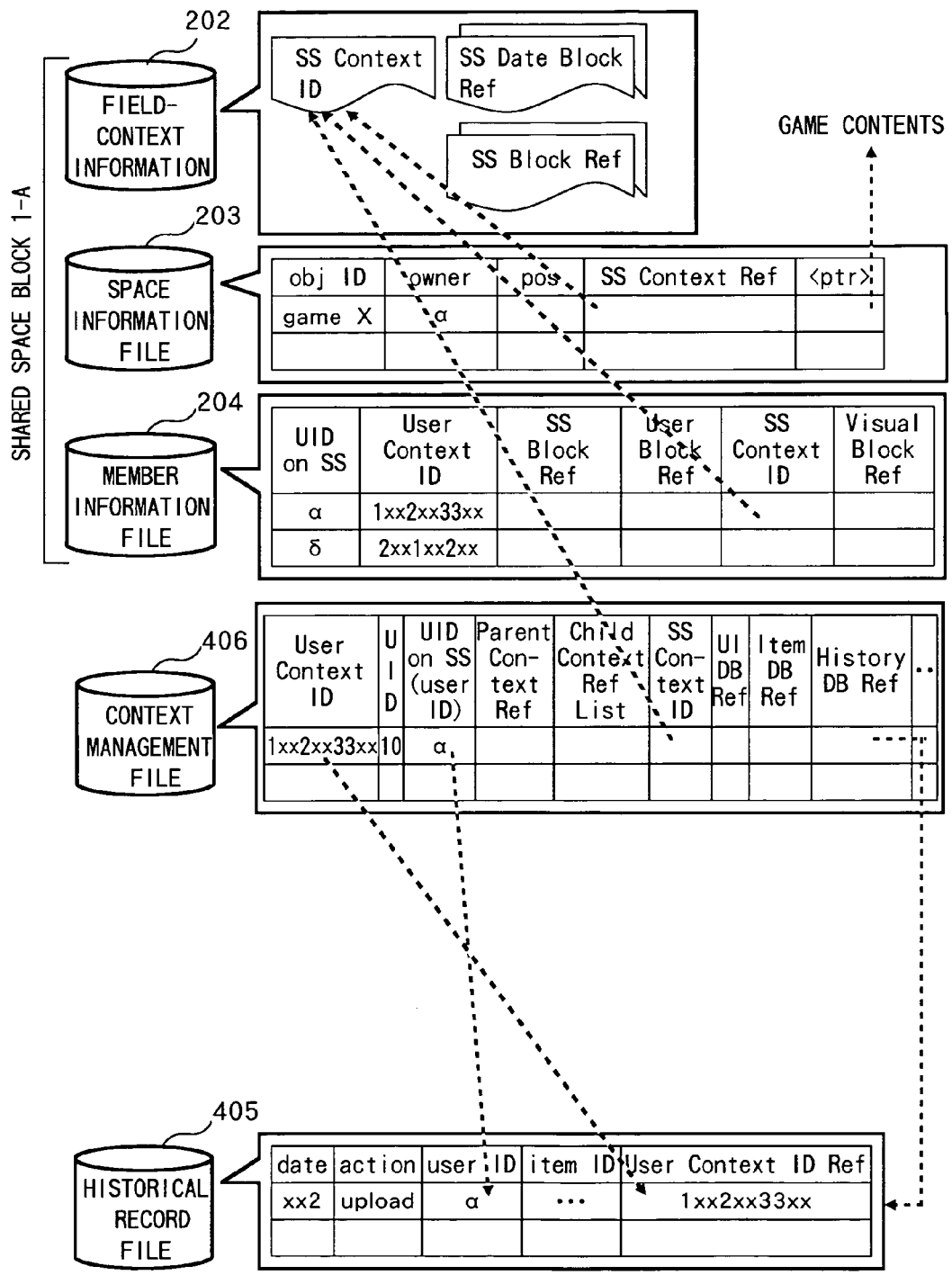
FIG. 24 is a view showing other states of information files on the network system.

Thereafter, when the user block α arranges contents for the game X on the shared field 1, the shared space block 1-A updates the space information file 203. The user block α updates the historical record file 405. FIG. 24 shows that status.

Figure 14:
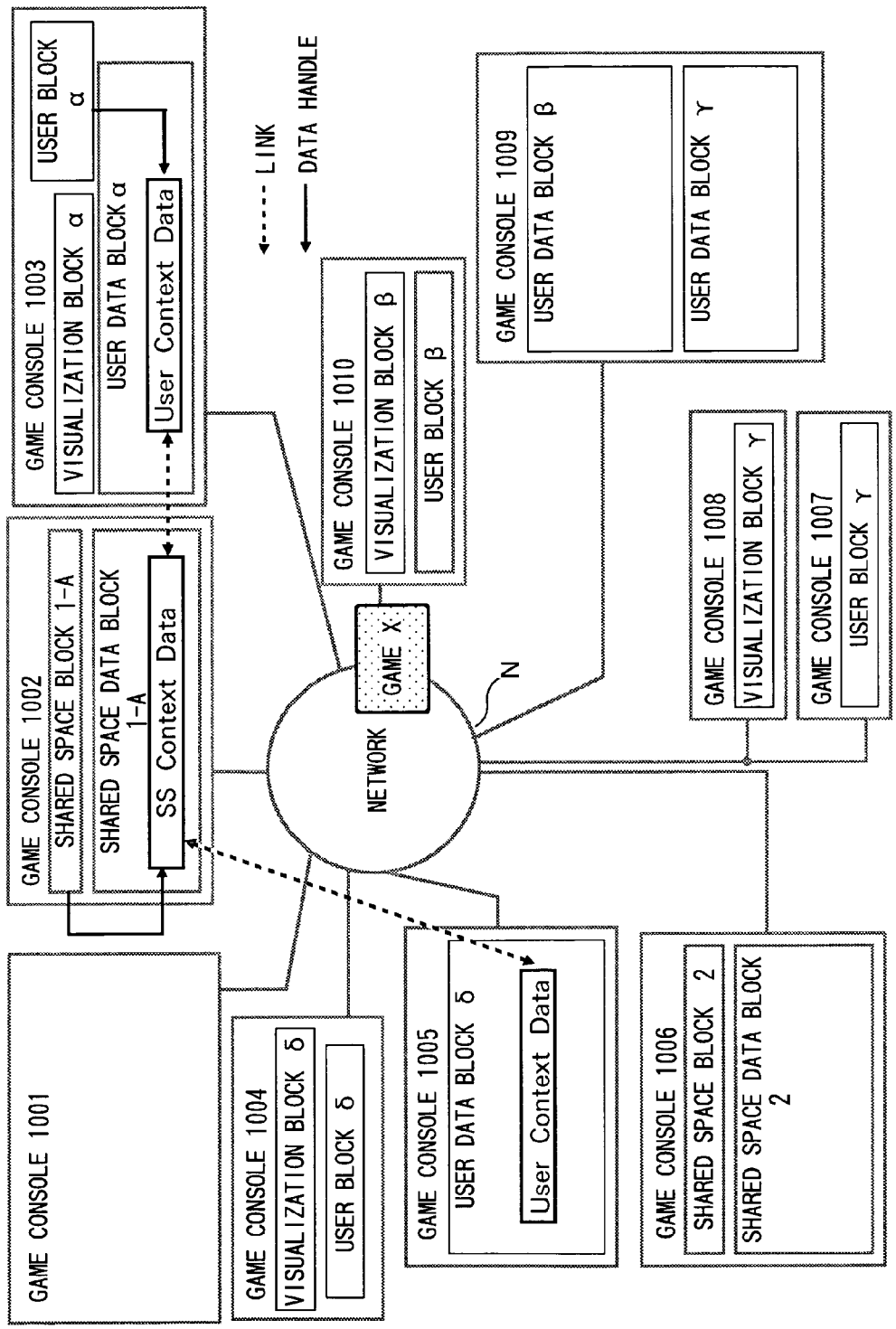
FIG. 14 is a view showing an event where a user β starts to locate a shared field for carrying out a game X.

Assume here, as shown in FIG. 14, that the user β handles the user block β of the game console 1010 to transmit the search message of "Game X" into the network N and, thereby, starts seeking the shared field to play the game X. The shared space block 1-A of the game console 1002 replies the user block β the reference as to the shared-field context (SS Context Data).

Figure 15:
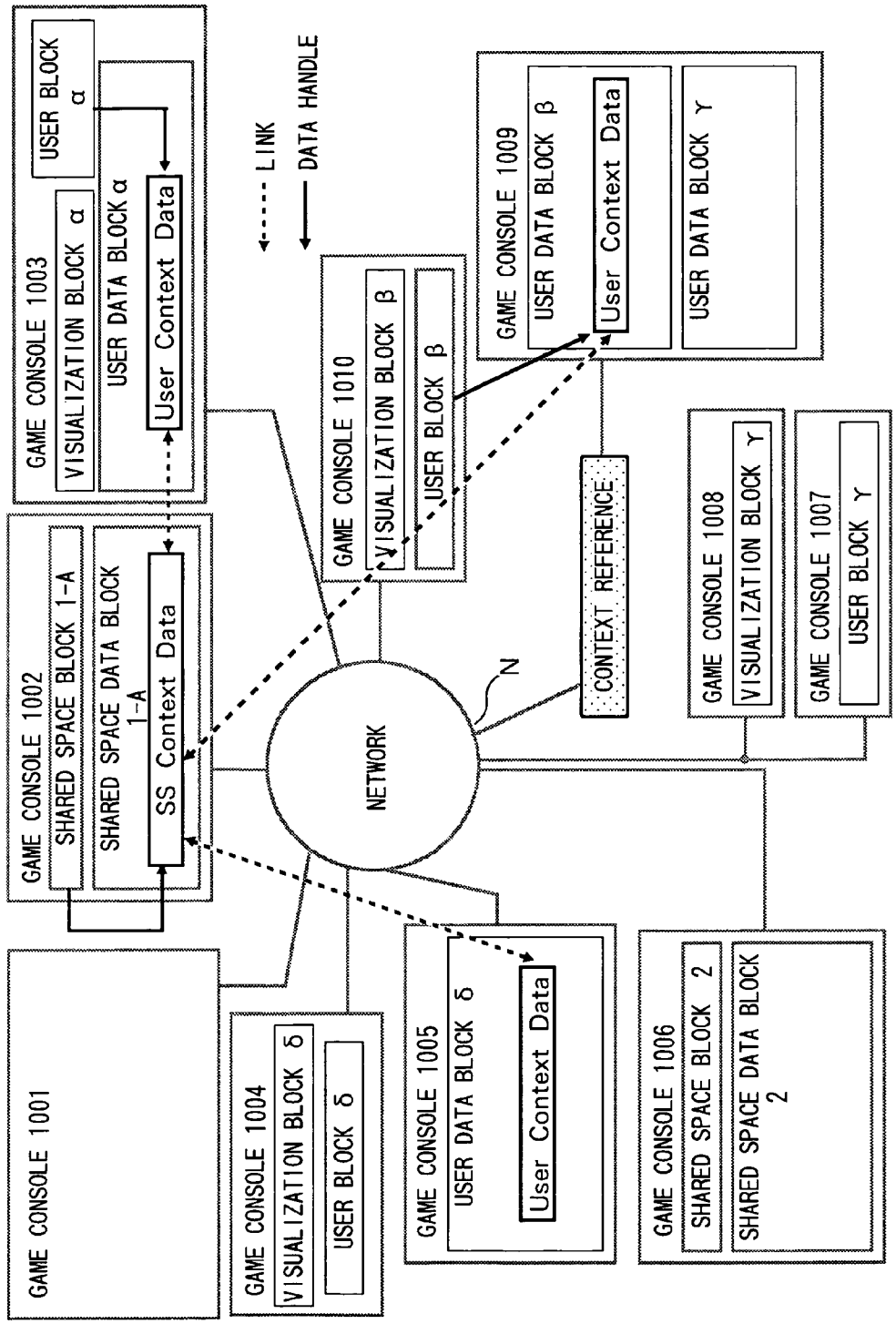
FIG. 15 is a view showing a user block β.

The status of the network system changes as shown in FIG. 15. The user block β creates its user context (User Context Data) and records it into the user data block β of the game console 1009. Furthermore, the user block β defines the reference for the context of the shared field 1 (SS Context Data). Thus, the context of the shared field 1 (SS Context Data) and the user context (User Context Data) of the user β are linked with each other so that the user β can participate in the shared field 1 in which the game X is held.

Figure 16:
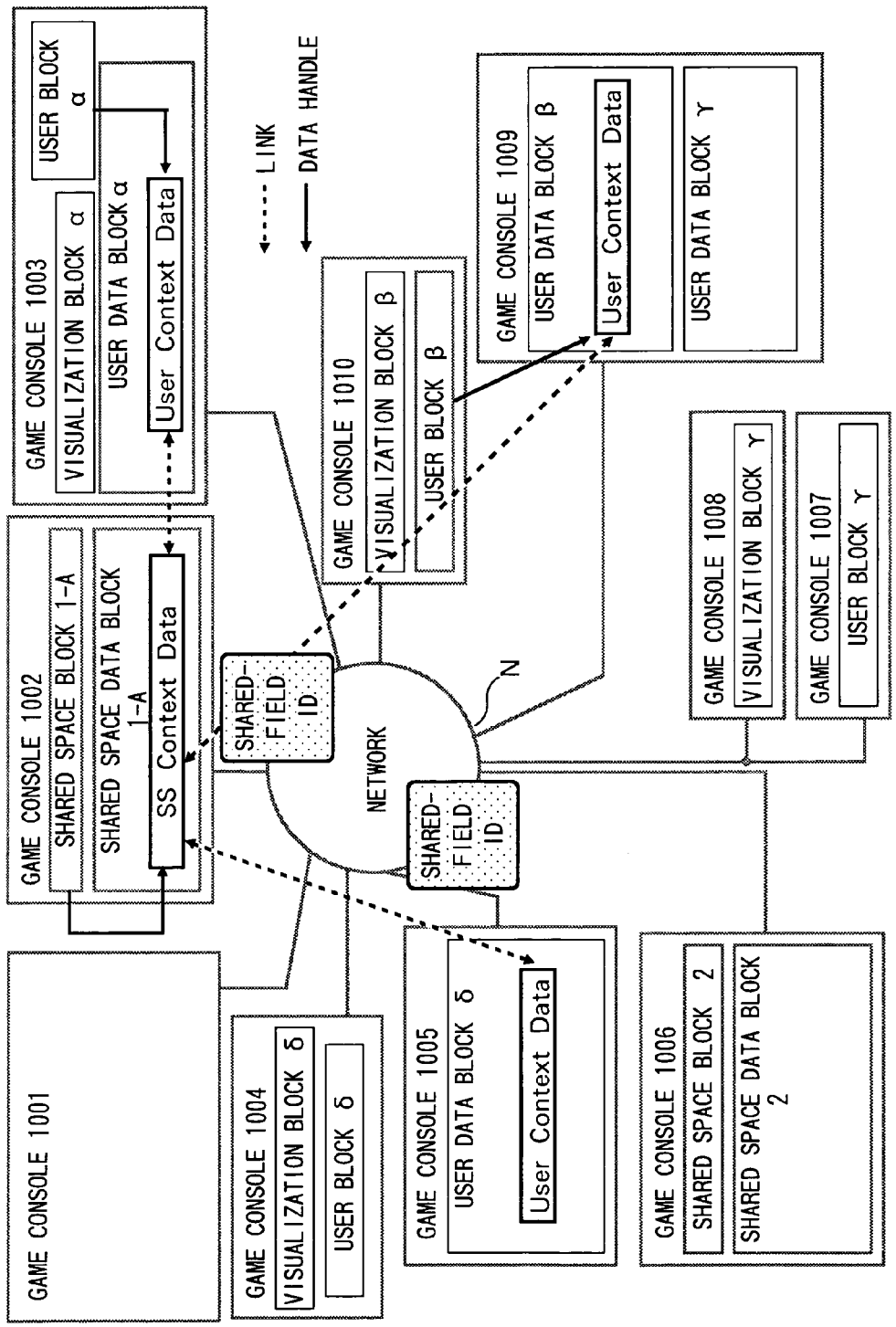
FIG. 16 is a view showing an event where the users δ, β create new shared field 2 on the network system which is derived from the current shared field 1.

Assume here that the user δ and the user β create a new shared field 2 which is for playing a new game and is derived from the current shared field 1. The status of the network system changes as shown in FIG. 16. In the status, the user δ and the user β transmit the same, unique shared-field ID from the respective game consoles 1004, 1010 into the network N, wherein the shared-field ID is determined by both users.

Figure 17:
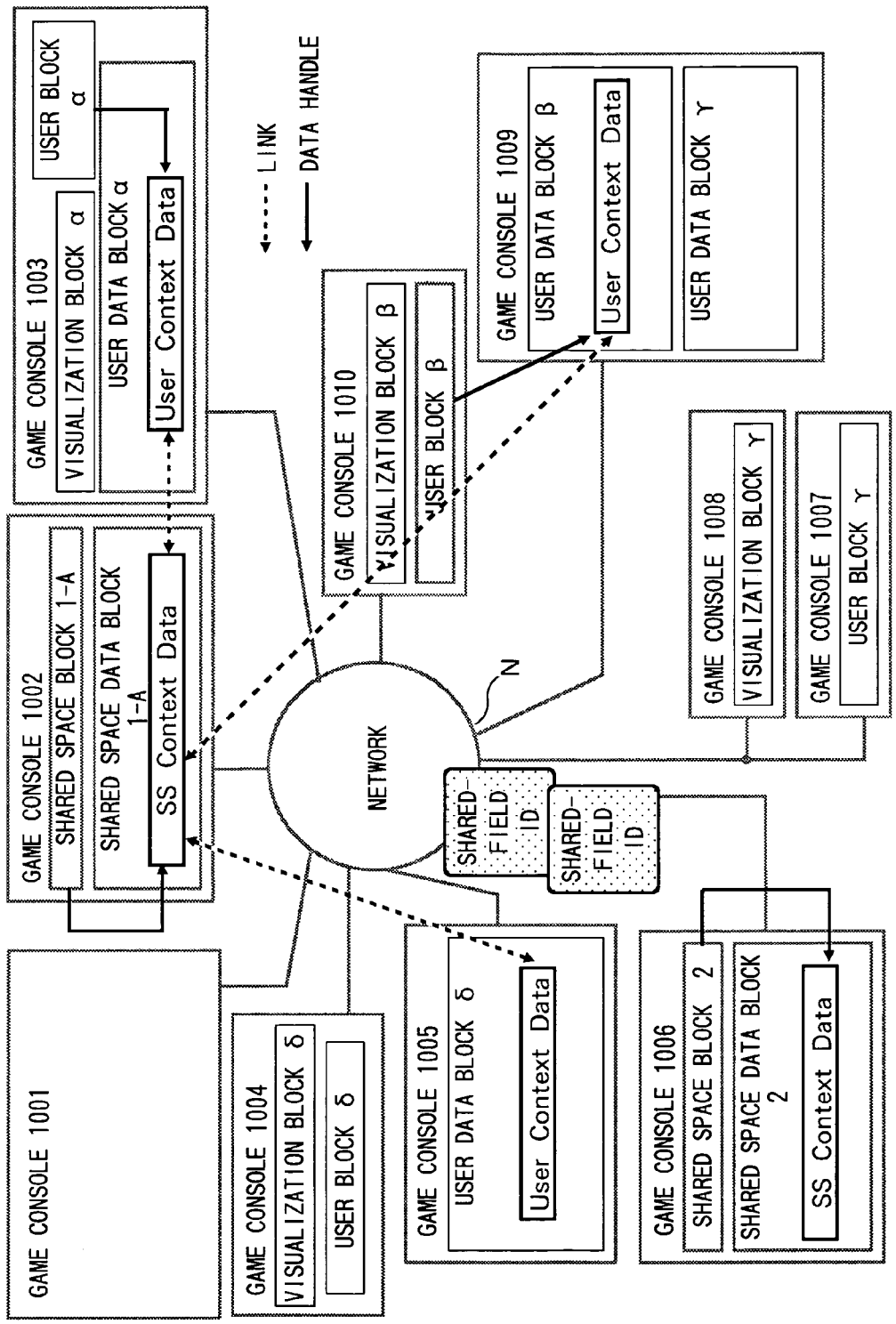
FIG. 17 is a view showing a shared space block upon creation of the shared field 2.

The status of the network system changes as shown in FIG. 17. The shared space block 2 of the game console 1006 receives the shared-field ID, creates the shared field 2 and the shared-field context (SS Context Data) and records the context (SS Context Data) into the shared space data block 2. The shared space block 2 transmits the created ID of the shared field (SS Context ID) and the reference for the shared field 2 towards the user block δ and the user block β.

Figure 18:
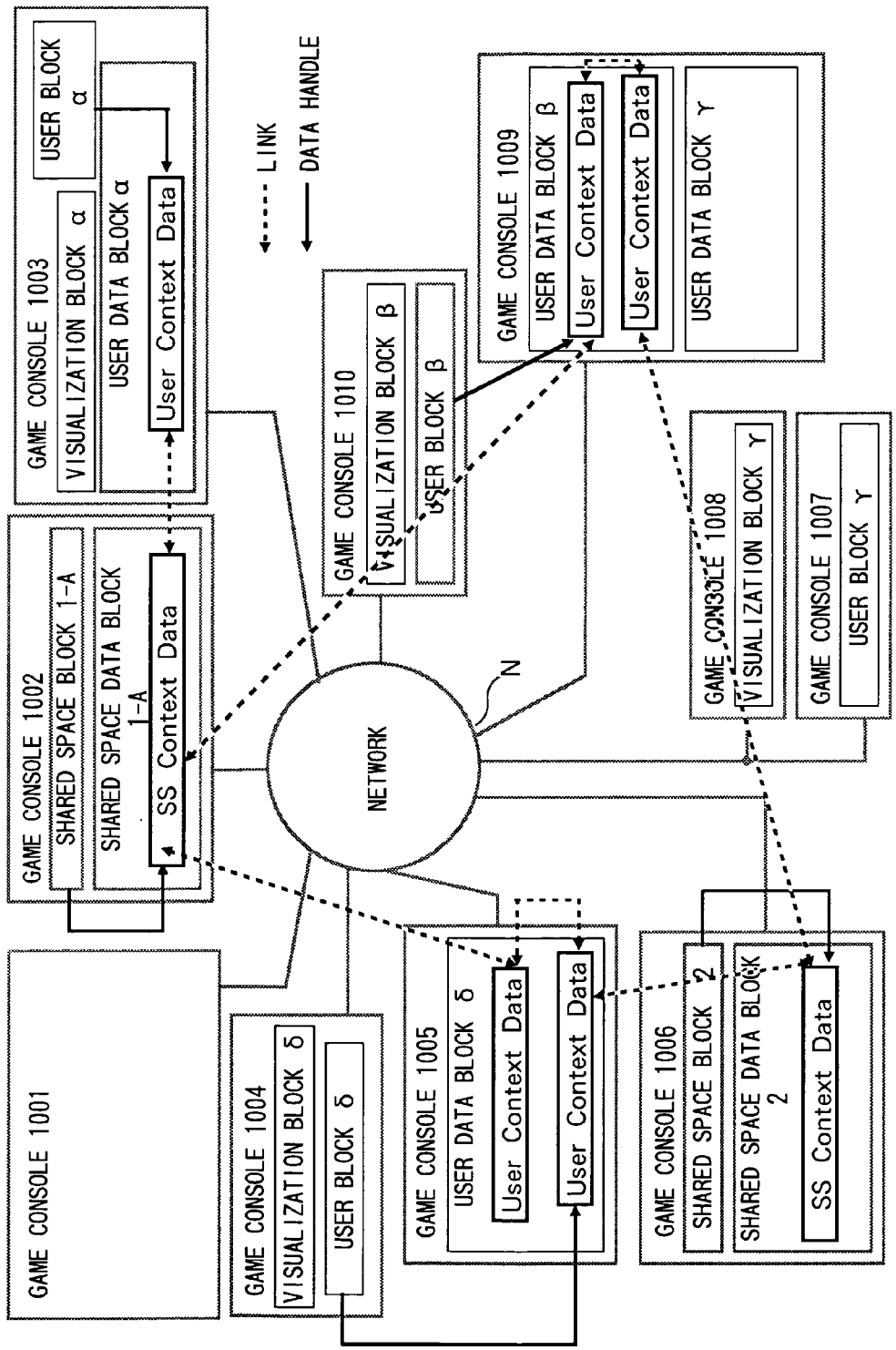
FIG. 18 is a view showing an event where the user 6 moves from the previous shared field to another shared field on the network system, accompanied with a user context from the previous shared field.
Figure 25:
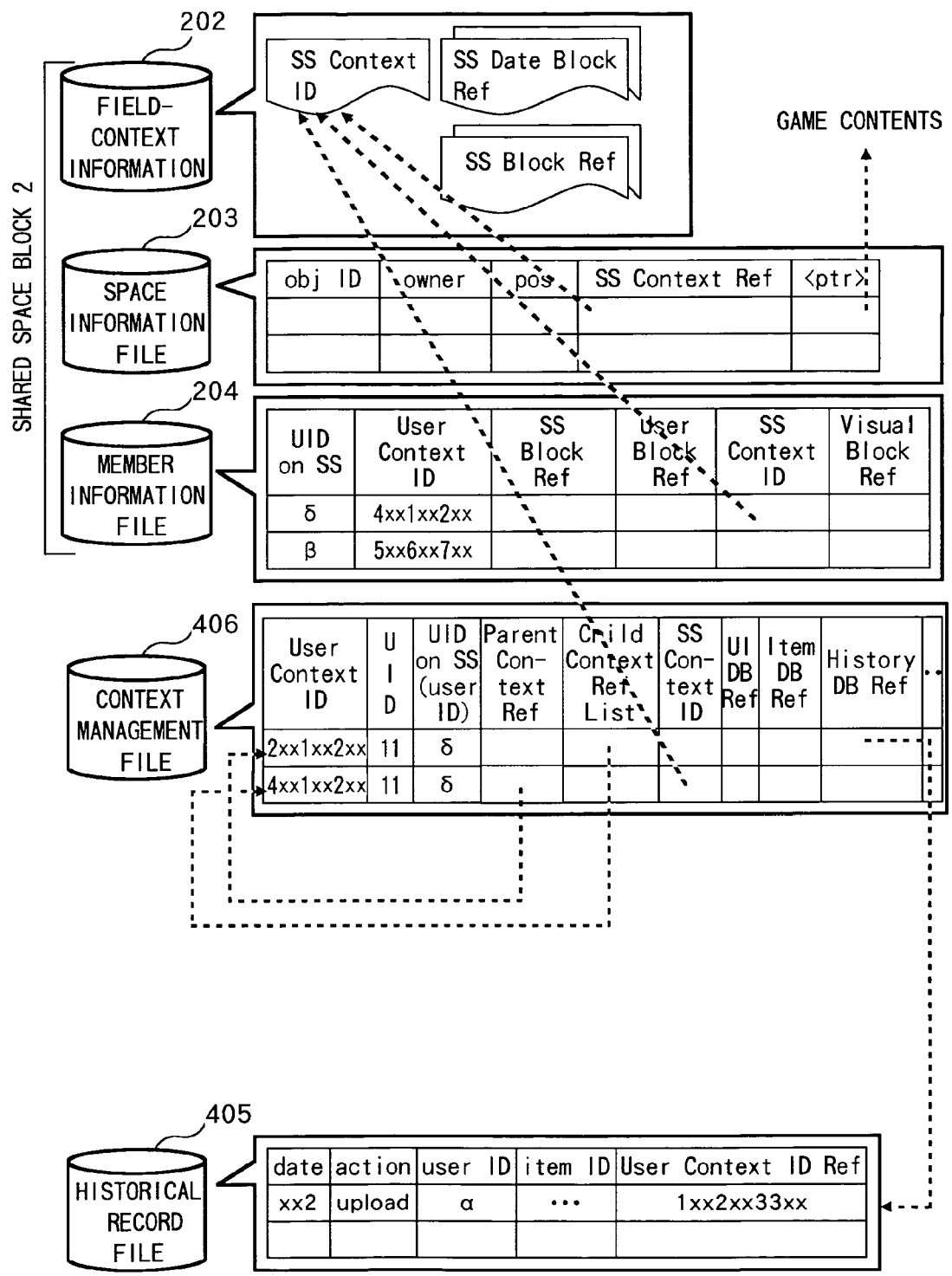
FIG. 25 is a view showing other states of information files on the network system.

The status of the network system changes as shown in FIG. 18. The user data block δ creates a new user context and records it into the user data block δ, wherein the user context is a derivation context inheriting the previous user context for the shared field 1 which is previous one. The user data block δ defines the reference for the shared field 2. FIG. 25 shows the updated condition corresponding thereto. The user block β carries out the similar processes. Thus, the context of the shared field 2 is linked with the user contexts of the user δ and the user β, respectively.

Figure 19:
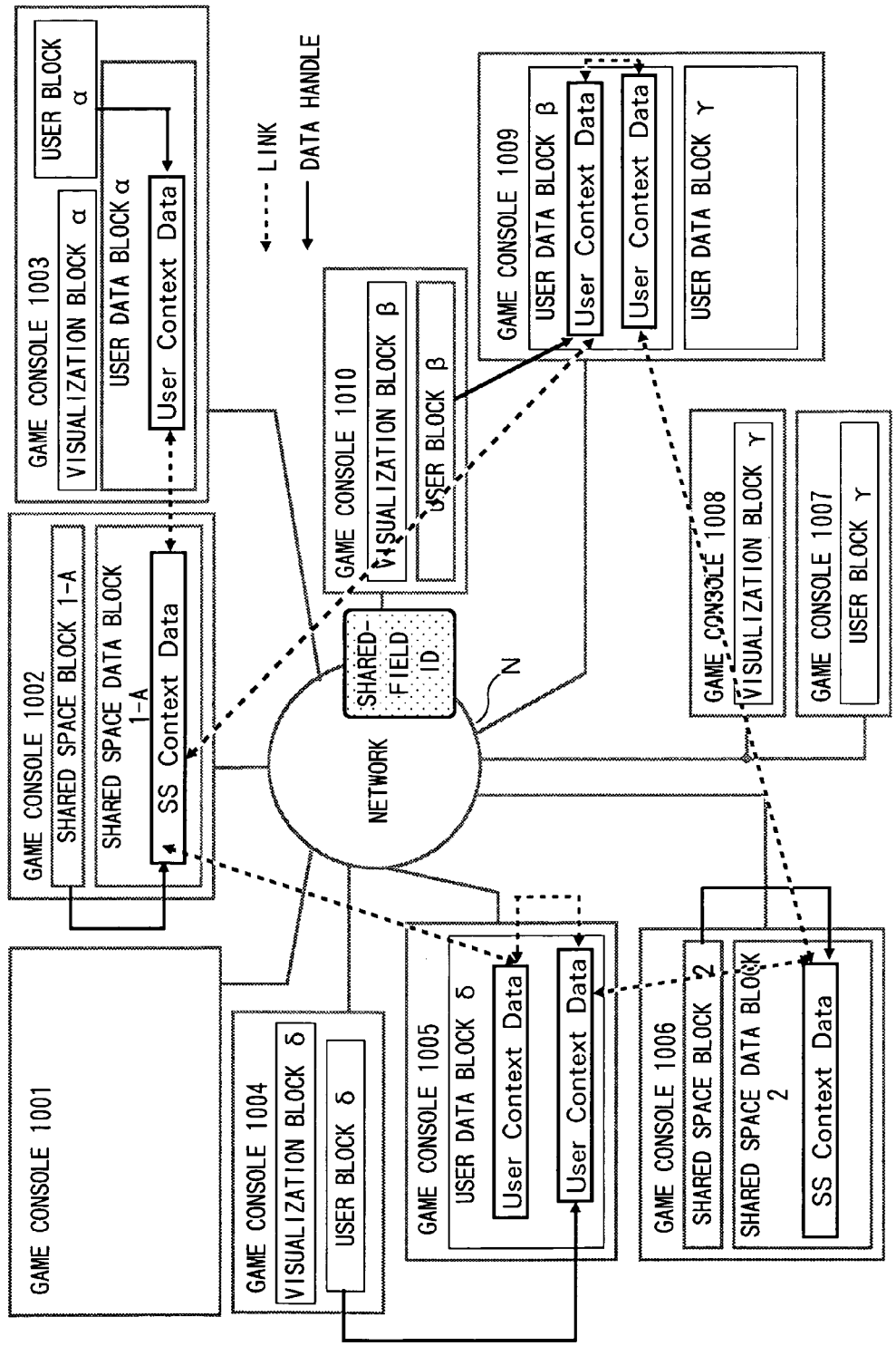
FIG. 19 is a view showing an event where the user β invites a user γ to the shared field 2 on the network system.

Assume here that the user β invites the user γ to the shared field 2. FIG. 19 shows that status of the network system. The user β sends out the shared-field ID of the shared field 2 to the user block γ by means of the user block β.

Figure 20:
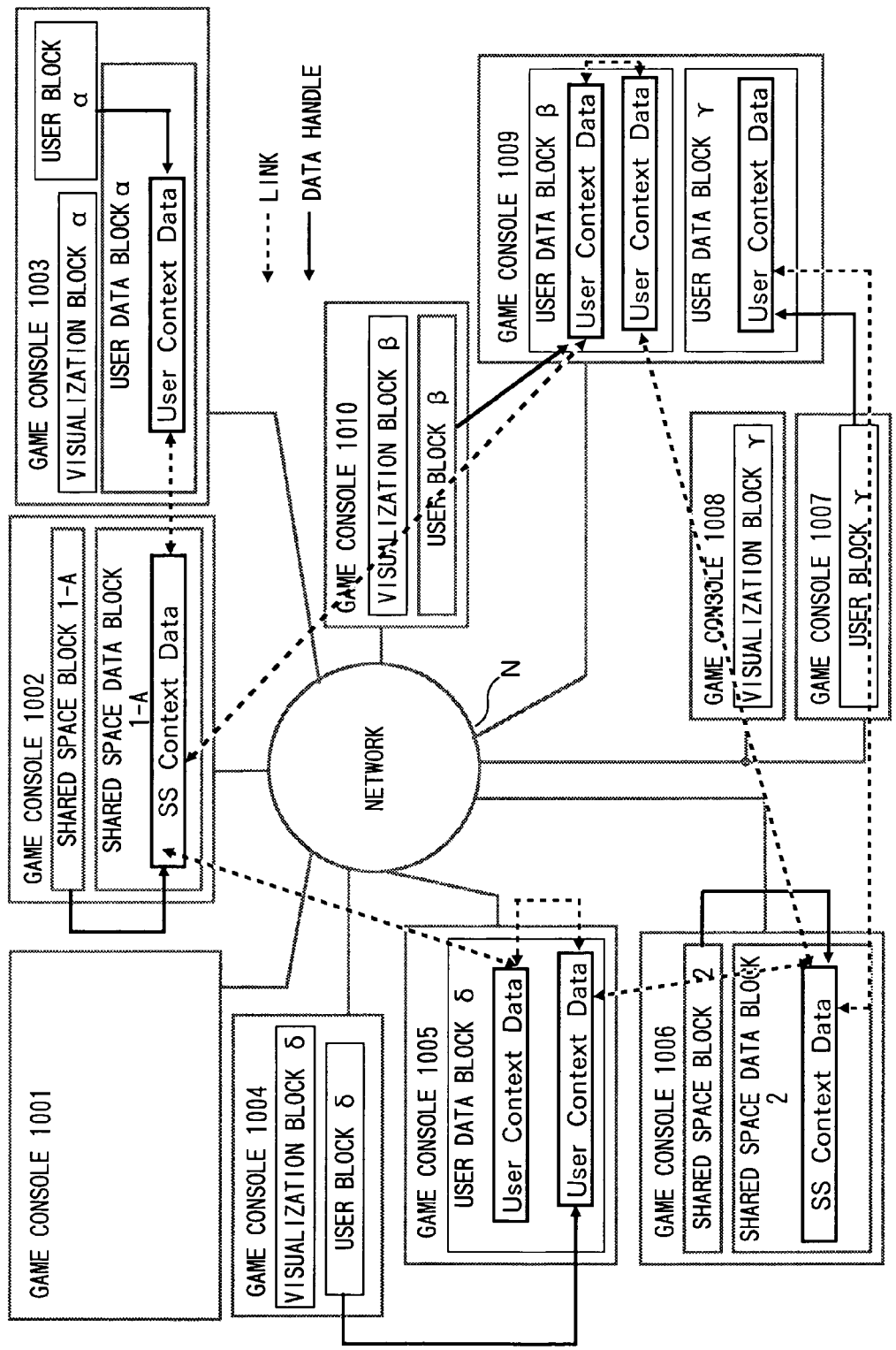
FIG. 20 is a view showing an event where the user γ participates in the shared field 2 on the network system.

The status of the network system changes as shown in FIG. 20. When receiving the shared-field ID of the shared field 2, the user block γ creates the user context (User Context Data) and records the user data block γ of the game console 1009. Furthermore, the user block γ defines the reference for the shared field 2. Thus, the context of the shared field 2 (SS Context Data) and the user context of the user γ (User Context Data) are linked with each other so that the user γ can participate in the shared field 2.

As apparent from the above explanation, by using the shared space blocks, every user can create user-mutually-enjoyable shared fields on a network space formed over a plurality of game consoles without any restrictions and without any dependencies on specific servers. Also, every user can leave a shared field anytime. For example, different shared fields may be created for the respective groups anytime, wherein members of each of the groups have the same interest. Also, each of the members may leave, if desire. According to the conventional approach where a specific server manages, it is quite difficult to manage shared fields as mentioned above.

In addition, according to the present embodiment, the network N holds the shared-field context and the user context caused by the interaction so that the user can always search refer for them by means of any one of nodes. Therefore, it is possible to find out, for example, the party of the user, the shared field participated by the user, the details of the interaction associated with the user and, in the case where the user experienced some shared fields, the kinds of the interactions carried out on the respective shared fields. Also, it is possible to track which shared field other users come together.

Furthermore, even when the user leaves a shared field and, in turn, participates in another shared field, the user can refer for its own context. In other words, the user can refer information including but not confined to his/her role in a network society formed on a shared field, even upon the participation into another shared field, so that he/she can make a communication under his/her familiar environment.

Although the present embodiment is illustrated by the use of the example of the game consol which has the shared space block functionable as a server, the present invention is not limited thereto. Another embodiment may be structured and constructed, wherein the above-described shared space lists and context lists are provided for a plurality of servers existing on the network independently of each other, and many game consoles access the servers to identify or recognize the party members' game consoles and create shared fields in cooperation with the party members' game consoles.

[Particular View Process for Network]

As described above, it is possible to visualize digital information pieces stored on the network in the network system according to the above embodiment, wherein the visualization is carried out by the visualization block 500 of an arbitrary node.

By using the visualization block 500, it is possible to grasp the whole state of the network as seen from each user's view.

For example, each of the plurality of shared fields holds the digital information pieces including the contexts generated therein and can always send the held digital information pieces to the game consoles of the users participating therein. Many distributed digital information pieces start from the respective shared fields (shared field nodes) and circulate on the network N. Therefore, each user receives a various kinds of the digital information pieces from many shared fields. If the visualization block 500 of the game console combines the received digital information pieces suitably and visualizes them, it is possible to visually grasp the activities experienced by the users on the network N. For example, when persons look up at the night sky, each person has a different view in correspondence with his/her position and distances from the respective stars, although each star emits the same light for every persons. The particular view process creates a representation similar to the user-dependent view of the stars, on the basis of the digital information pieces which are held and circulated on the network N.

To be more specific, the visualization block 500 receives the digital information pieces from the neighboring user nodes or shared fields, and the visualization manager 501 creates for-display data sets. Furthermore, the visualization manager 501 links the created for-display data sets with the respective identifications of the shared field nodes, on which the corresponding digital information pieces exist, and records the for-display data sets and the respective identifications of the shared field nodes into the predetermined memory area. The image processor 502 carries out a predetermined image process on the recorded for-display data sets to determine the view comprised of the images. The resultants of the image processing are output via the output controller 503 on the output device, for example, the display of the monitor.

Figure 26:
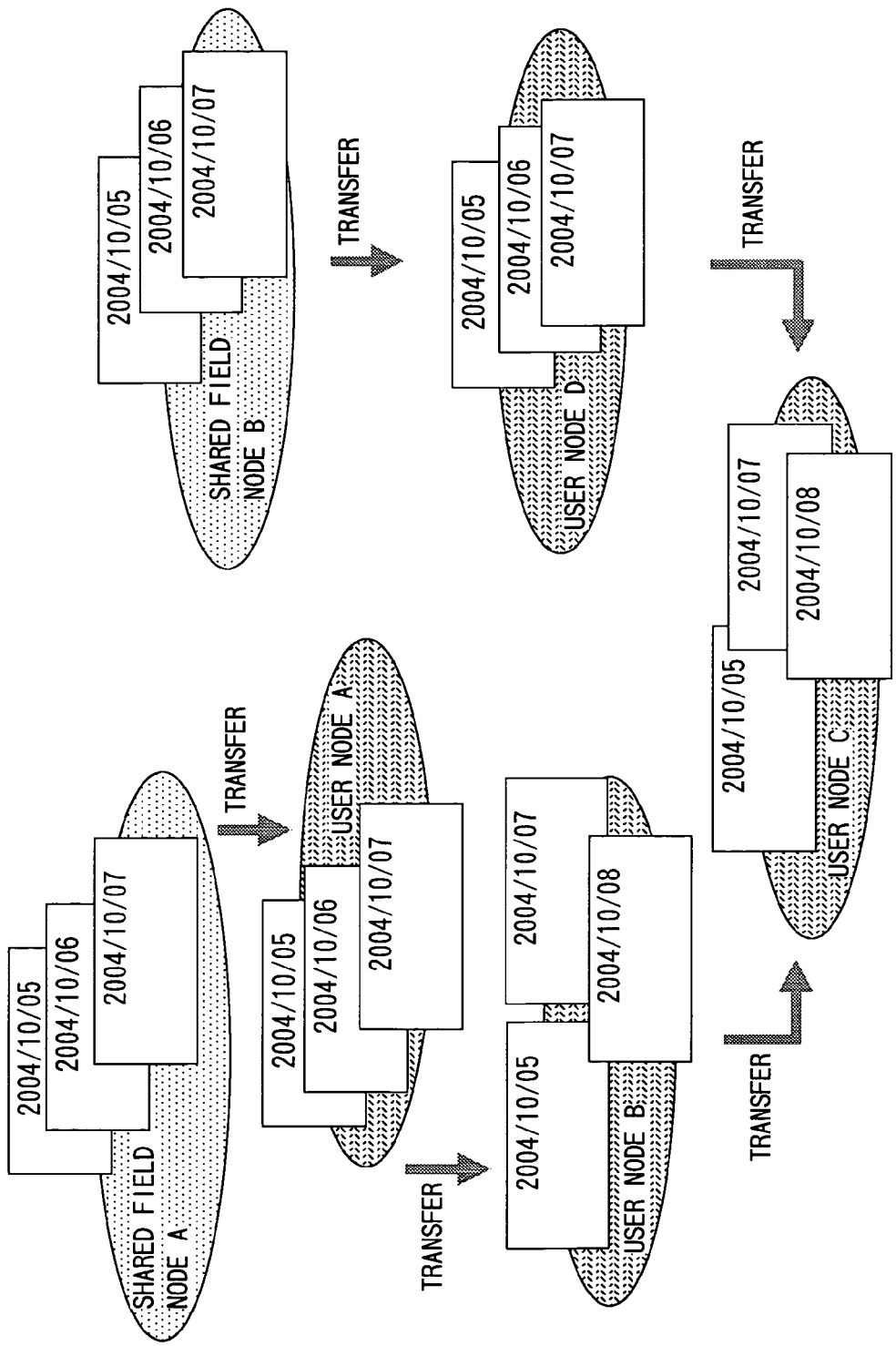
FIG. 26 is a view schematically showing a concept of a particular view process in case where a shared field has, as objects, snapshots possessing time records as their attributes.

FIG. 26 shows an example where each shared field holds, as digital information pieces of the aims of the visualization, a group of images having time records as their attributes, for example, snapshots of the activities carried out on the shared field.

On a shared field A, there are three snapshots which a user took on Oct. 5 to 7, 2004, respectively. The user node can always display the snapshots by accessing them. When the user moves from the shared field node to a user node A, the user node A can also display the three snapshots, as apparent from the above-described storing way of contexts. In view of objects, the objects are transmitted from the shared field A to the user node A. Likewise, in connection with the user's activities on the network N, snapshots taken on Oct. 5 and 7, 2004 are transmitted from the user node A to a user node B. On the user node B, another snapshot taken on Oct. 5, 2004 is added, while the snapshot taken on Oct. 6, 2004 is lost.

Figure 27:
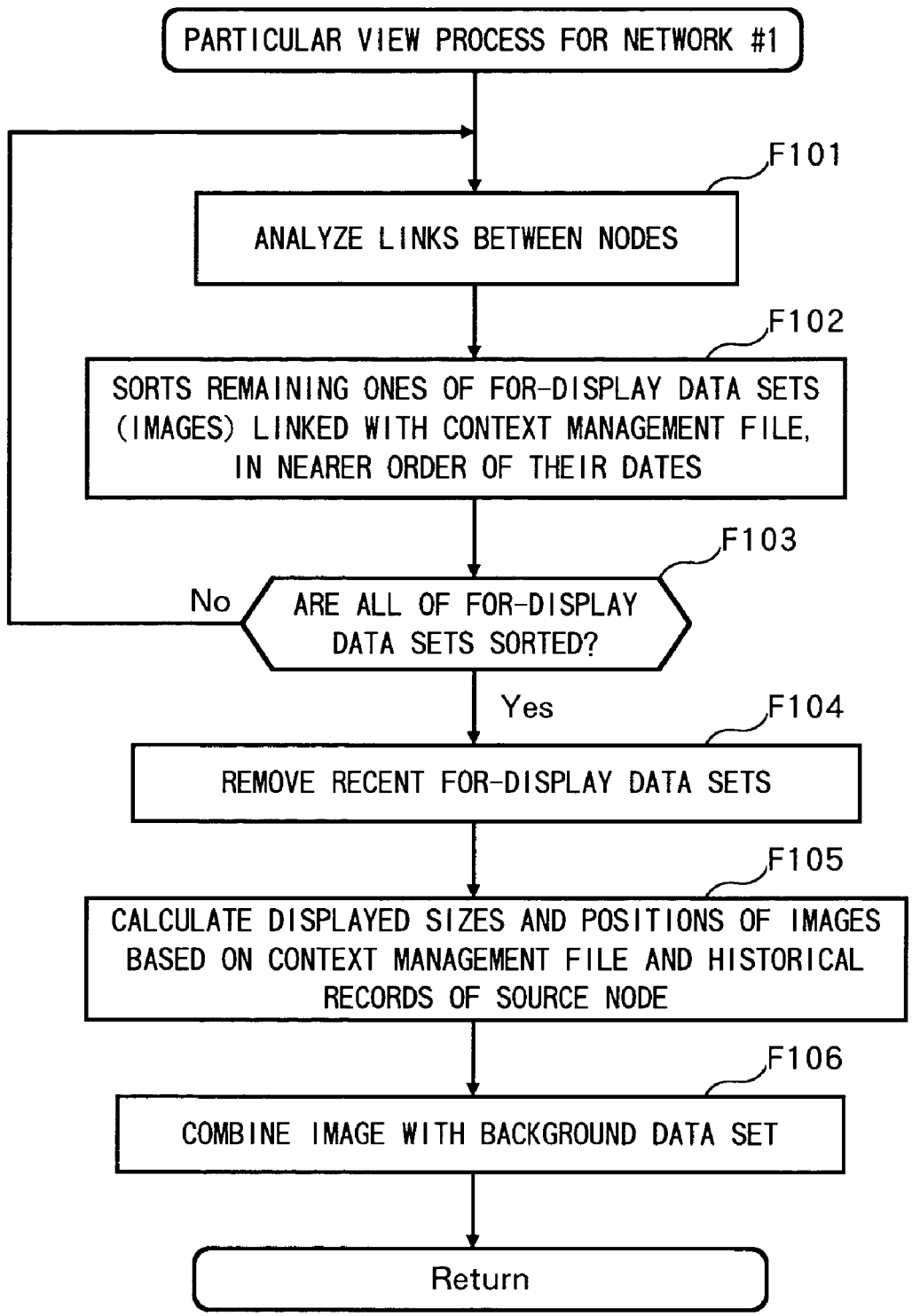
FIG. 27 is a flowchart showing a first particular view process.

On a shared field B, there are also three snapshots which the user took on Oct. 5 to 7, 2004, respectively. After the snapshots are transmitted to a user node D, two snapshots of October 5 and 7 among them are transmitted to a user node C. In this case, the particular view process for the network carried out by the game console is illustrated in FIG. 27.

In response to a request from the user, the visualization manager 501 of the visualization block 500 of the game console analyzes the links between the nodes based on the user's activities from the context management file and so on (F102). The visualization manager 501 sorts for-display data sets linked with the context management file, i.e. existing ones among images of the snapshots, in nearer order of their dates (F102). The visualization manager 501 repeatedly carries out the steps F101 and F102 for other for-display data sets (F103: No). After all of for-display data sets are sorted (F103: Yes), the visualization manager 501 removes recent for-display data sets (F104).

The visualization manager 501 calculates sizes and positions which are of the snapshots when they are displayed as images on the basis of the context management file of the source node (F105). If a plurality of information pieces are transmitted from a single shared field through different routes thereto, their amount of information are measured so that the information pieces having the larger amount of information are converted into the for-display data sets with higher priorities, wherein amount of information is for example the data size of each snapshot or the number of them. Then, the image processor 502 converts them into images and combines the images with a prepared background data set (F106) to output the combined image into the output controller 503. The output controller 503 leads a display of a user node, ex. the user node A of FIG. 26, to display the combined image.

Figure 28:
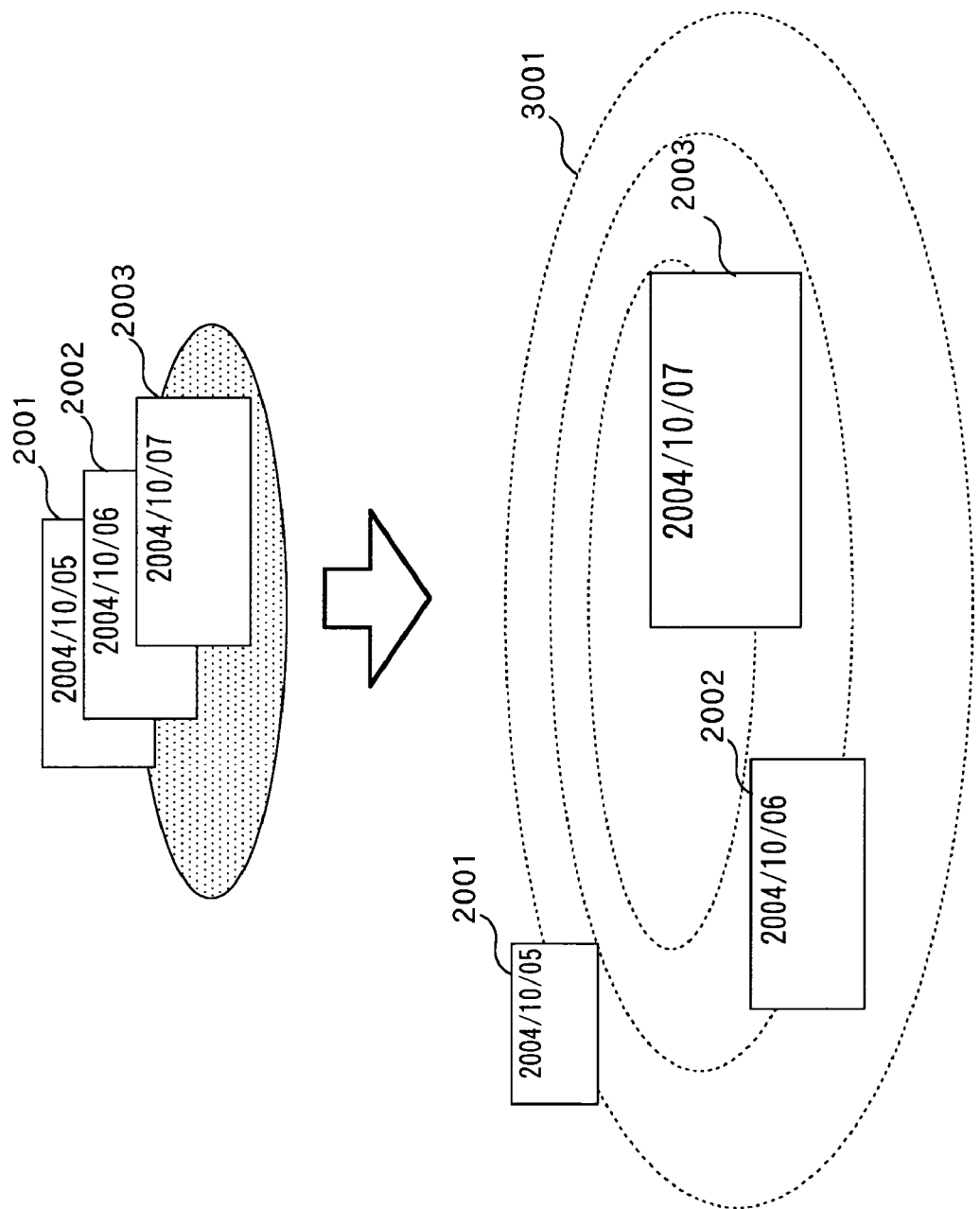
FIG. 28 is a view showing a visible information example provided by the first particular view process.

The lower part of FIG. 28 shows an example of the images displayed on the display of the user node A based on the above-described particular view process. The upper part of FIG. 28 shows three snapshots 2001 to 2003 which are managed on the user node A. The snapshots 2001 to 2003 are so regulated that they have smaller sizes as their dates are older. The snapshots are arranged on a time space 3001.

The visualization manager 501 may sort the for-display data sets not based on the dates of the snapshots but based on the number of nodes they passed through. Alternatively, the visualization manager 501 may sort the for-display data sets in a manner that sizes and positions of the displayed images are dependent on the combinations of their dates and the nodes they passed through. In this case, the visualization manager 501 carries out the conversion to the for-display data sets so that, for example, user nodes nearer to his/her user node or to the shared field node are displayed on positions closer to the center of the display.

Further modification may be so applied that a shared field node is limited to distribute too old dates of snapshots. In conjunction with it, the visualization manager 501 calculates "the number of shots=the number of accesses to the shared field" so that more active shared field can transmit snapshots farther therefrom.

The network system according to the invention allows the modification that three-dimensional model information pieces with a plurality of degrees of abstraction are prepared for each object on an information file, which is not shown, of the visualization block 500, and the model information pieces are visualized as weighted graphic information pieces.

For example, an aim of an attention-grabbing activity is regarded as one with the lowest degree of abstraction and is assigned with a number "1", a space for the activity is assigned with a number "2" and peripheral information pieces around the space are assigned with a number "3." Under the assignments, the model information pieces corresponding to the above-defined numbers indicative of degrees of abstraction are read out of the above-mentioned information file so that the user node can display them.

Figure 29:
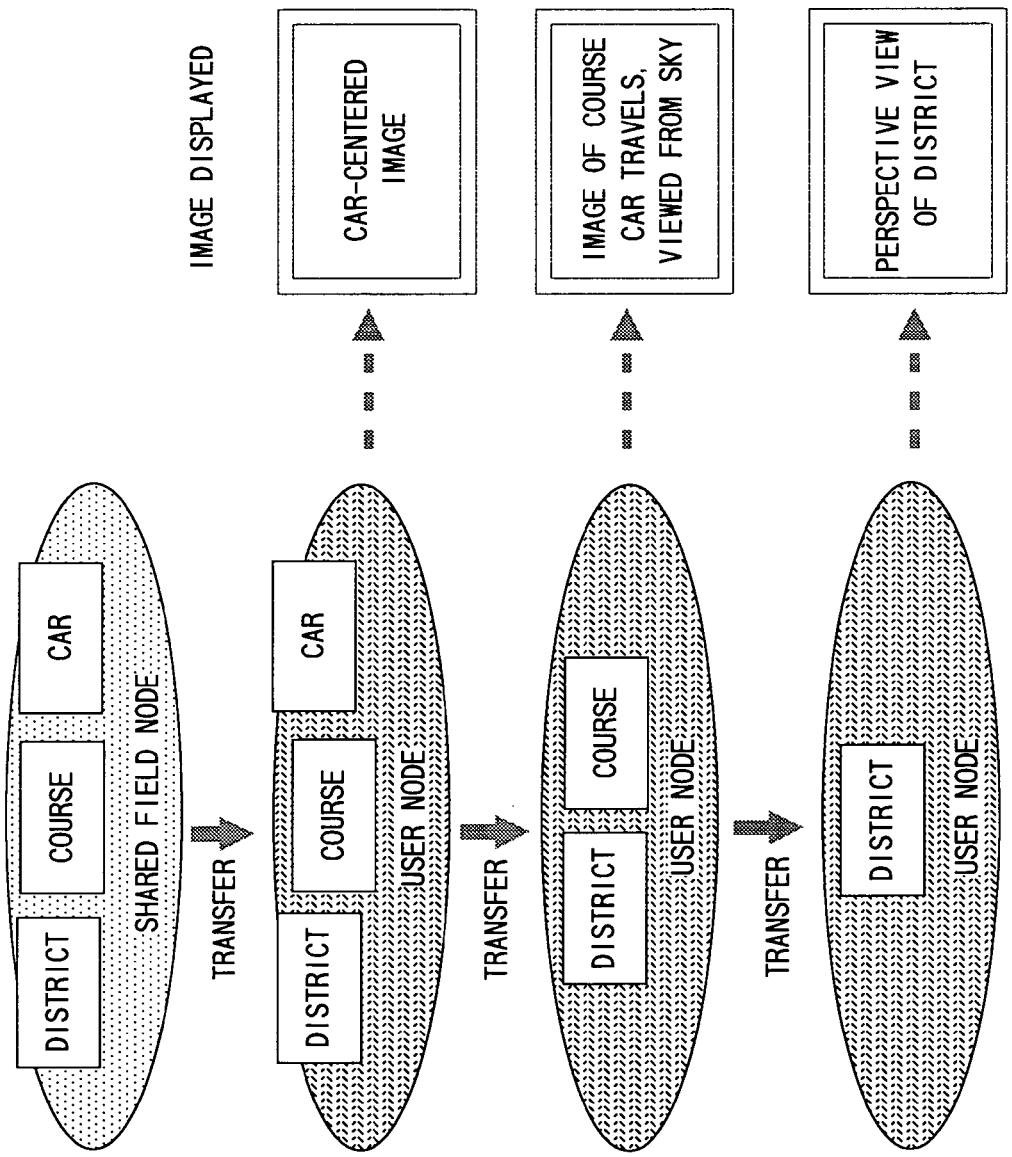
FIG. 29 is a view showing a concept of a second particular view process.

FIG. 29 shows an example of images displayed on a user node of a user participating in a race game which is held in a shared field. According to the example, on the information file, there are provided images of cars for the race, images of courses on which the cars travel and images of districts where the courses exist.

The images of the districts are assigned with a number "3", which indicates the highest degree of abstraction. The images of the courses are assigned with a number "2", which indicates relatively high degree of abstraction. The images of the cars are assigned with a number "1", which indicates the lowest degree of abstraction. On the user node closest to the shared field node, a car-centered image is displayed; on the next closest user node, an image of the course, on which the cars travel, as viewed from the sky is displayed; on the farthest user node, an image of the district is displayed.

Figure 30:
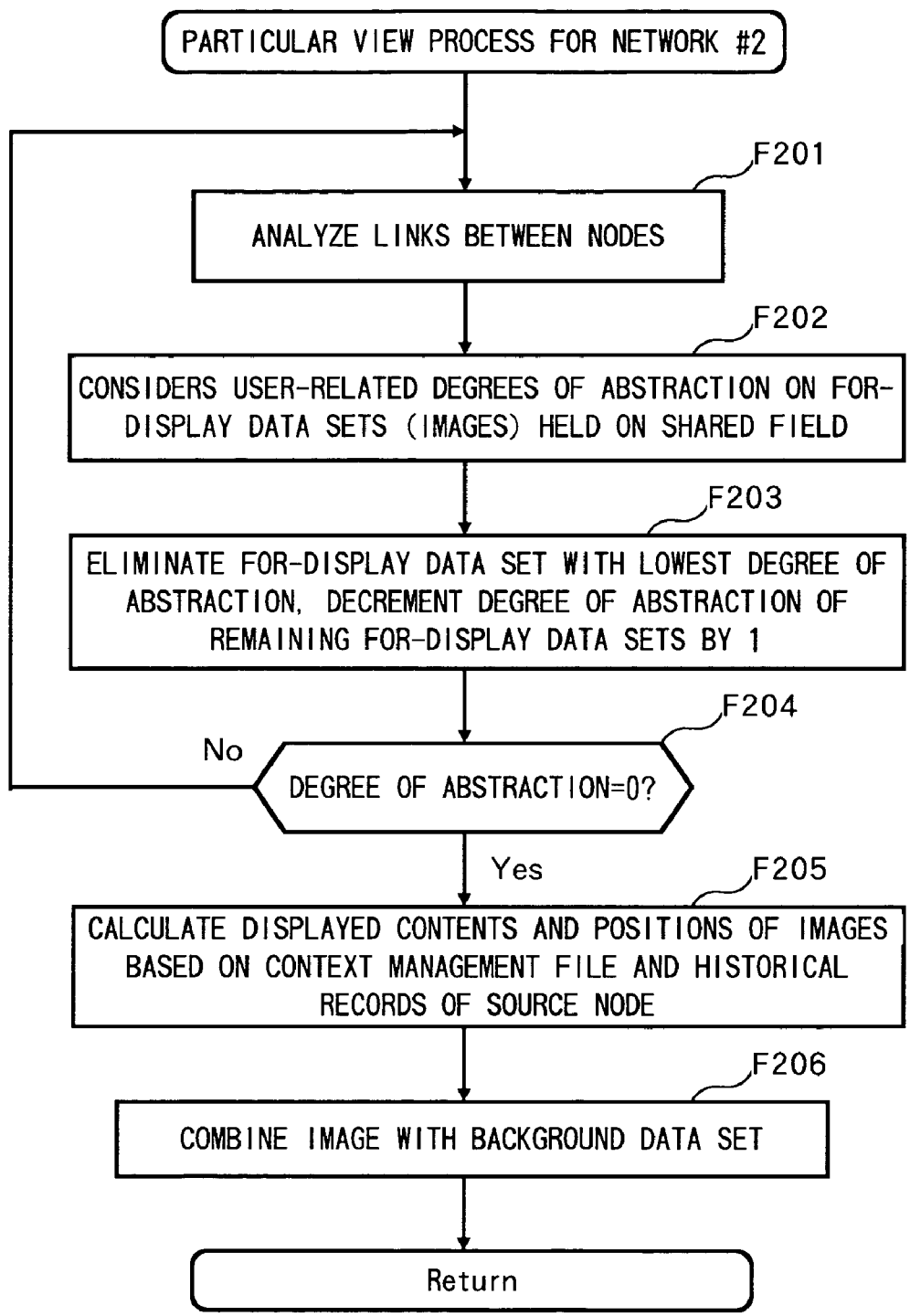
FIG. 30 is a flowchart showing the second particular view process.

FIG. 30 is a flowchart showing the steps of a particular view process which is carried out by the game console (visualization block 500) of each user node to realize the above-illustrated displays.

In response to a request from the user, the visualization manager 501 analyzes the links between the nodes based on the user's activities from the context management file and so on (F201). The visualization manager 501 considers user-related degrees of abstraction on the for-display data sets (images displayed on the basis of the model information file) held on the shared field (F202). Then, the visualization manager 501 eliminates the for-display data set with the lowest degree of abstraction and decrements degrees of abstraction of remaining for-display data sets by "1" (F203). The visualization manager 501 repeatedly carries out the steps F201 and F202 until the degree of abstract is equal to "0" (F204: No). When the degree of abstract is equal to "0" (F204: Yes), the visualization manager 501 calculates positions of displayed images on the basis of the context management file of the source node (F205). The image processor 502 converts the thus regulated for-display data sets into images and combines the images with a prepared background data set (F206) to output the combined image into the output controller 503. The output controller 503 leads a display of a user node to display the combined image.

FIG. 29 shows the example of the race game. In the case of a soccer game, assignments of numbers are for example as follows: an image of a soccer stadium with a number "1"; an image of a soccer field in the stadium with a number "2"; and an image of each soccer player playing in the field with a number "1."

According to the above-described particular view process, the visualization block 500 can provide different views of the digital information pieces existing on a plurality of shared field nodes residing on the network N, in correspondence with the relation between his/her user node and the respective shared field nodes. The particular view process is applicable to a community network. In detail, the process makes it possible to display images of members larger and closer to the center of the display screen as the members have closer relations with him/her. The process makes it possible to display images of members with more amount of information as the members have closer relations with him/her. Thus, it is possible to visually grasp much amount of information on a large-scaled community network. Therefore, the process can contribute to effective data distribution.

What is claimed is:

1. A context management method carried out in a network system in which a plurality of computers is connected to a network, the method comprising:

creating or updating a shared field which is accessible by a plurality of users through a plurality of computers, respectively, wherein creating or updating the shared field is carried out by one of the computers connected to the network;

storing a shared-field context in a first memory area on the network, wherein storing the shared-field context is carried out by the computer which carried out creating or updating the shared field, the shared-field context describes at least one of features of the shared field, the features are caused within the shared field by inputs from the users accessing the shared field or by interactions among the plurality of users, and;

storing a user context as well as a reference in a second memory area on the network, wherein storing the user context as well as the reference is carried out by each of the computers accessing the shared field, the user context is a context which is unique to a user operating one of the accessing computers and is caused within the shared field by an input from the operating user or by the interaction associated with the operating user, and the reference is usable for referring to the first memory area, wherein each user of the plurality of users is led to obtain, though an arbitrary one of the computers, the user context of the each user stored in the second memory area or the shared-field context of the shared field, which the user accessed, by the use of the reference stored in the second memory area, wherein one of the computers connected to the network obtains the user context from the second memory area and accesses the shared field or a different shared field in connection with the obtained user context, which concerns the user operating the computer in question.

2. The method according to claim 1, wherein creating or updating the shared field is carried out, on the basis of a preformed query, by one of the computers which receives the query, wherein the query is transmitted from another one of the computers connected to the network and describes a condition relating to creating or updating the shared field.

3. The method according to claim 1, wherein:
a shared space list in which context IDs for identifying the respective shared-field contexts are listed up, is distributed on the network N,
wherein a context list in which a member information including identification of user context is recorded in a list form is distributed on the network N; and
wherein, using an arbitrary one of the computers, each user of the plurality of the users can find out the shared field in which the user previously participated and a previous computer that the each user used on the previously shared field, through inspections of the shared space list and the context list, and can refer to the context that is stored in the previous computer.

4. The method according to claim 3, wherein the computer obtaining the user context creates a new user context by modifying the former user context used upon the access to the shared field or to the different shared field, wherein the modification is carried out on the basis of the interaction between users within the shared field accessed and on the basis of change of the shared-field context caused by the interaction, and the computer stores the created new user context in the second memory area.

5. The method according to claim 1, wherein the computer creating or updating the shared field updates a content of the shared-field context in correspondence with the user context of the user which operates the computer accessing the shared field.

6. The method according to claim 5, wherein:
each of the user contexts includes an attribute which is unique to the user operating one of the accessing computers and is changed in accordance with each of the interaction that the user carries out in the shared field accessed; and
on the basis of the attributes included in the user contexts of the users, the computer creating or updating the shared field creates relation information to identify a relation between the users and updates the shared-field context stored in the first memory area to add the relation information into the shared-field context.

7. The method according to claim 6, wherein:
in addition to an identification usable for identifying the user in question, the attribute comprises at least one of a favorite, a time record, a shared-field identification, an act record, an experience record, and a party record, wherein the favorite is of the user in question, the time record is of the access of the user to the shared field, the shared-field identification is usable for identifying the shared field accessed by the user, the act record relates to activities of the user, the experience record includes information which kind of impression, sympathy and satisfaction the user experiences, the party record is usable for identifying another member who interacts with the user in the shared field; and
the computer creating or updating the shared field creates the relation information by identifying the users whose user contexts have the attributes equal to or similar to each other in consideration of a predetermined condition.

8. The method according to claim 1, wherein:
each of the plurality of computers is on an equality with other computers and is performable separately from the other computers; and
the first and the second memory areas are formed on one of the computers which is accessible by any other ones of the computers through the network.

9. The method according to claim 8, wherein the computer connected to the network transfers all of information, records and data of the context management to another available computer before leaving network.

10. The method according to claim 8, wherein:
each of the computers is provided with a router function so that it corresponds to a first node identified by a network address and holds, on a predetermined memory, routing information concerning another node neighboring the first node; and
each of the computers, responsive to information which is transferred from a second node neighboring the first node but is not addressed to the first node, adds the network address of the second node to the transferred information and further transfers the transferred information with the addition towards another node identified by the routing information.

11. A network system comprising:
first means for creating or updating a shared field which is accessible by a plurality of users through a plurality of computers, respectively;
second means for storing a shared-field context in a first memory area on the network, wherein the shared-field context describes at least one of features of the shared field, the features are caused within the shared field by inputs from the users accessing the shared field or by interactions among the plurality of users;
third means for storing a user context as well as a reference in a second memory area on the network, wherein the user context is a context which is unique to a user operating one of the accessing computers and is caused within the shared field by an input from the operating user or by the interaction associated with the operating user, and the reference is usable for referring to the first memory area; and
fourth means for leading each user of the plurality of users to obtain, through an arbitrary one of the computers, the user context of the each user stored in the second memory area or the shared-field context of the shared field, which the user accessed, by the use of the reference stored in the second memory area, wherein one of the computers connected to the network obtains the user context from the second memory area and accesses the shared field or a different shared field in connection with the obtained user context, which concerns the user operating the computer in question.

12. The network system according to claim 11, wherein the first means receives a preformed query and creates or updates the shared field on the basis of the query, wherein the query is transmitted from another one of the computers and is transferred on the network, the query describing a condition relating to creating or updating the shared field.

13. The network system according to claim 12, further comprising a communicator adapted to send, back to a source node of the query, information enabling the source node to access the shared field created or updated by the first means.

14. The network system according to claim 11, wherein the first means further comprises:
arrangement and arbitration module operative to arrange objects existing on the shared field and to arbitrate between activities of the objects; and
management module operative, under the arbitration by the arrangement and arbitration module, to control procedural steps in interactions among a plurality of users within the shared field and to notify the second means of changes caused by the interactions within the shred field.

15. The network system according to claim 11, wherein the second means comprises: a user-context obtainer adapted to obtain a user context of a user accessing the shared field; and a shared-field-context updater adapted to update the shared-field context in correspondence with the obtained user context.

16. The network system according to claim 15, wherein:
each of the user contexts includes an attribute which is unique to the user operating one of the accessing computers and is changed in accordance with each of the interactions that the user carries out in the shared field accessed; and
the second means creates, on the basis of the attributes included in the user contexts of the users, relationship information to identify a relationship between the users and updates the shared-field context stored in the first memory area to add the relationship information into the shared-field context.

17. The network system according to claim 11, wherein the third means modifies the user context, which has been already stored in the second memory area, every time the user carries out the interaction in the shared field accessed, wherein the modification is carried out on the basis of the interaction and on the basis of change of the shared-field context caused by the interaction.

18. The network system according to claim 11, wherein, in response to a request from one of computers connected to the network, the third means sends back to the computer at least one of the user context and the reference which are stored in the second memory area.

19. A computer connected to a network, including a processor executable a computer program, wherein, in cooperation with hardware resources existing on the network, the processor selectively functions as one of:
first means for creating or updating a shred field which is accessible by a plurality of users through a plurality of computers, respectively;
second means for storing a shared-field context in a first memory area on the network, wherein the shred-field context describes at least one of features of the shared field, the features are caused within the shared field by inputs from the users accessing the shared field or by interactions among the plurality of users;
third means for storing a user context as well as a reference in a second memory area on the network, wherein the user context is a context which is unique to a user operating one of the accessing computers and is caused within the shared field by an input from the operating user or by the interaction associated with the operating user, and the reference is usable for referring to the first memory area; and
fourth means for leading each user of the plurality of users to obtain, through an arbitrary one of the computers, the user context of the each user stored in the second memory area or the shared-field context of the shared field, which the user accessed, by the use of the reference stored in the second memory area, wherein one of the computers connected to the network obtains the user context from the second memory area and accesses the shared field or a different shared field in connection with the obtained user context, which concerns the user operating the computer in question.

20. A computer program embedded in a computer-readable medium and adapted to cause a computer connected to a network to function as at least one of:

first means for creating or updating a shared field which is accessible by a plurality of users through a plurality of computers, respectively;
second means for storing a shared-field context in a first memory area on the network, wherein the shared-field context describes at least one of features of the shared field, the features are caused within the shared field by inputs from the users accessing the shared field or by interactions among the plurality of users;
third means for storing a user context as well as a reference in a second memory area on the network, wherein the user context is a context which is unique to a user operating one of the accessing computers and is caused within the shared field by an input from the operating user or by the interaction associated with the operating user, and the reference is usable for referring to the first memory area; and
fourth means for leading each user of the plurality of users to obtain, through an arbitrary one of the computers, the user context of the each user stored in the second memory area or the shared-field context of the shared field, which the user accessed, by the use of the reference stored in the second memory area, wherein one of the plurality of computers obtains the user context from the second memory area and accesses the shared field or a different shared field in connection with the obtained user context, which concerns the user operating the computer in question.

21. The method according to claim 2, wherein the computer holds the received query as search information until the condition is met, and creates a shared field when the condition is met.

22. The computer according to claim 19, wherein the first means receives a preformed query and creates or updates the shared field on the basis of the query, wherein the query is transmitted from another one of the computers and is transferred on the network, the query describing a condition relating to creating or updating the shared field.

23. The computer according to claim 22, further comprising a communicator adapted to send, back to a source node of the query, information enabling the source node to access the shared field created or updated by the first means.

24. The computer according to claim 19, wherein the first means further comprises:
arrangement and arbitration module operative to arrange objects existing on the shared field and to arbitrate between activities of the objects; and
management module operative, under the arbitration by the arrangement and arbitration module, to control procedural steps in interactions among a plurality of users within the shared field and to notify the second means of changes caused by the interactions within the shared field.

25. The computer according to claim 19, wherein the second means comprises: a user-context obtainer adapted to obtain a user context of a user accessing the shared field; and a shared-field-context updater adapted to update the shared-field context in correspondence with the obtained user context.

26. The computer according to claim 25, wherein:
each of the user contexts includes an attribute which is unique to the user operating one of the accessing computers and is changed in accordance with each of the interactions that the user carries out in the shared field accessed; and
the second means creates, on the basis of the attributes included in the user contexts of the users, relationship information to identify a relationship between the users and updates the shared-field context stored in the first memory area to add the relationship information into the shared-field context.

27. The computer according to claim 19, wherein the third means modifies the user context, which has been already stored in the second memory area, every time the user carries out the interaction in the shared field accessed, wherein the modification is carried out on the basis of the interaction and on the basis of change of the shared-field context caused by the interaction.

28. The computer according to claim 19, wherein, in response to a request from one of computers connected to the network, the third means sends back to the computer at least one of the user context and the reference which are stored in the second memory area.

29. The computer program embedded in a computer-readable medium according to claim 20, wherein the first means receives a preformed query and creates or updates the shared field on the basis of the query, wherein the query is transmitted from another one of the computers and is transferred on the network, the query describing a condition relating to creating or updating the shared field.

30. The computer program embedded in a computer-readable medium according to claim 20, wherein the first means further comprises:
arrangement and arbitration module operative to arrange objects existing on the shared field and to arbitrate between activities of the objects; and
management module operative, under the arbitration by the arrangement and arbitration module, to control procedural steps in interactions among a plurality of users within the shared field and to notify the second means of changes caused by the interactions within the shared field.

31. The computer program embedded in a computer-readable medium according to claim 20, wherein the second means comprises:
a user-context obtainer adapted to obtain a user context of a user accessing the shared field; and
a shared-field-context updater adapted to update the shared-field context in correspondence with the obtained user context.

32. The computer program embedded in a computer-readable medium according to claim 31, wherein:
each of the user contexts includes an attribute which is unique to the user operating one of the accessing computers and is changed in accordance with each of the interactions that the user carries out in the shared field accessed; and
the second means creates, on the basis of the attributes included in the user contexts of the users, relationship information to identify a relationship between the users and updates the shared-field context stored in the first memory area to add the relationship information into the shared-field context.

33. The computer program embedded in a computer-readable medium according to claim 20, wherein the third means modifies the user context, which has been already stored in the second memory area, every time the user carries out the interaction in the shared field accessed, wherein the modification is carried out on the basis of the interaction and on the basis of change of the shared-field context caused by the interaction.

34. The computer program embedded in a computer-readable medium according to claim 20, wherein, in response to a request from one of computers connected to the network, the third means sends back to the computer at least one of the user context and the reference which are stored in the second memory area.

* * * * *